(12) United States Patent
He

(10) Patent No.: US 9,377,901 B2
(45) Date of Patent: Jun. 28, 2016

(54) DISPLAY METHOD, A DISPLAY CONTROL METHOD AND ELECTRIC DEVICE

(71) Applicants: BEIJING LENOVO SOFTWARE LTD., Beijing (CN); LENOVO (BEIJING) CO., LTD., Beijing (CN)

(72) Inventor: Zhiqiang He, Beijing (CN)

(73) Assignees: BEIJING LENOVO SOFTWARE LTD., Beijing (CN); LENOVO (BEIJING) CO., LTD., Beijing (CN)

(*) Notice: Subject to any disclaimer, the term of this patent is extended or adjusted under 35 U.S.C. 154(b) by 146 days.

(21) Appl. No.: 14/177,035

(22) Filed: Feb. 10, 2014

(65) Prior Publication Data
US 2014/0292724 A1    Oct. 2, 2014

(30) Foreign Application Priority Data
Mar. 27, 2013    (CN) .......................... 2013 1 0100818

(51) Int. Cl.
*G06F 3/041*    (2006.01)
*G06F 3/042*    (2006.01)

(52) U.S. Cl.
CPC .................................. *G06F 3/0421* (2013.01)

(58) Field of Classification Search
CPC ........... G06F 3/02; G06F 3/033; G06F 3/041; G09G 5/00; G09G 5/08; G06K 11/06; G08C 21/00
USPC ................................................. 345/168–174
See application file for complete search history.

(56) References Cited

U.S. PATENT DOCUMENTS

| | | | | |
|---|---|---|---|---|
| 2002/0186221 A1* | 12/2002 | Bell | ........................ | G06F 3/011 345/474 |
| 2012/0098852 A1* | 4/2012 | Kuribayashi et al. | . | G06F 3/0426 345/592 |
| 2012/0212647 A1* | 8/2012 | Ueno et al. | ............. | G03B 17/54 348/231.99 |
| 2012/0262487 A1* | 10/2012 | Huebner | ................. | G06F 3/016 345/634 |
| 2013/0285919 A1* | 10/2013 | Larsen | ................... | G06F 3/0425 345/173 |

* cited by examiner

*Primary Examiner* — Pegeman Karimi
(74) *Attorney, Agent, or Firm* — Peter Su; Dentons US LLP

(57) ABSTRACT

The present invention discloses a display method, for determining user's operations and thereby reducing a rate of error response of electronic devices. The method includes determining a first image to be projected; projecting the first image, the first image being capable of forming on the touch sensing unit when the second electronic device is in the projection area and the touch sensing unit faces towards the first electronic device; receiving first operation information transmitted by the second electronic device, the first operation information being information acquired by the second electronic device in response to a first operation performed by a user on the touch sensing unit; determining a second image based on the first image and the first operation information; and projecting the second image. The present invention also discloses a display control method, and electronic devices for implementing the previously mentioned two methods respectively.

16 Claims, 4 Drawing Sheets

DISPLAY METHOD, A DISPLAY CONTROL METHOD AND ELECTRIC DEVICE

CROSS REFERENCE TO RELATED APPLICATIONS

This application claims the benefit under 35 U.S.C. §119 (a) of Chinese Patent Application No. 201310100818.6, filed on Mar. 27, 2013, the entire disclosure of which is incorporated by reference herein in its entirety.

TECHNICAL FIELD

The present disclosure relates to the field of projection and computing device technology, and more particularly to a display method, a display control method, and an electronic device.

BACKGROUND

With the continuous development of science and technology, electronic technology has been rapidly developed, types of electronic products are more and more diversified, and people enjoy a variety of conveniences brought by science and technology development. Now people can enjoy a comfortable life brought by science and technology developments through various electronic devices.

In the prior art, projectors are not limited to large projectors, there are many small electronic devices, such as tablet PCs (PAD), mobile phones (including smart phones or feature phones (non-smart phones)), or PCs (personal computers, especially laptops) etc. provided with a projection function unit to facilitate the use at any moment.

During projection, for example, a user can project contents onto different carriers such as a wall, and a table etc., and the prior art allows the user to operate on a projection plane directly. However, in the prior art, the general practice is to set a camera around a projector head, thereby the user' gesture is acquired through the camera, and then what type of response should be made is determined by analyzing the user's gesture.

However, due to the size of small devices and the limitation of accuracy, the results in adopting such manner to identify the user's gesture may cause a higher rate of error response, because the icon of the projection plane that identifies the user's gesture cannot be accurately analyzed. After an error response, the user needs to re-operate, which not only increases burden on the devices, but also wastes time and creates inconveniences for the user.

SUMMARY

Embodiments of the present disclosure provide a display method, a display control method, and an electronic device, for solving the problem that the rate of error response of the small and medium projection devices is higher in the prior art and achieving the technical effect of reducing the rate of error response.

A display method applied to a first electronic device having a projecting unit with a projection area and capable of communicating with a second electronic device having a touch sensing unit, wherein the method includes steps of determining a first image to be projected; projecting the first image, the first image being capable of forming on the touch sensing unit when the second electronic device is in the projection area and the touch sensing unit faces towards the first electronic device; receiving first operation information transmitted by the second electronic device, the first operation information being information acquired by the second electronic device in response to a first operation performed by a user on the touch sensing unit; determining a second image based on the first image and the first operation information; and projecting the second image.

In some embodiments, prior to projecting the first image, the method further includes steps of determining a first ratio of the first image, and a second ratio of a touch sensitive region of the touch sensing unit; judging whether or not the first ratio and the second ratio match; and the step of projecting the first image, the first image being capable of forming on the touch sensing unit when the second electronic device is in the projection area and the touch sensing unit faces towards the first electronic device includes projecting the first image when the first ratio and the second ratio match, the first image being capable of forming on the touch sensing unit when the second electronic device is in the projection area and the touch sensing unit faces towards the first electronic device.

In some embodiments, after judging whether or not the first ratio and the second ratio match, the method further includes a step of judging whether or not a first distance between the first electronic device and the second electronic device is within a predetermined distance range; projecting the first image, the first image being capable of forming on the touch sensing unit when the second electronic device is in the projection area and the touch sensing unit faces towards the first electronic device includes projecting the first image when the first distance is within the predetermined distance range, being capable of forming the first image on the touch sensing unit when the second electronic device is in the projection area and the touch sensing unit faces towards the first electronic device.

In some embodiments, after judging whether or not a first distance between the first electronic device and the second electronic device is within a predetermined distance range, the method further includes a step of when the first distance is less than a minimum value of the predetermined distance range, altering area of the first image from a first area value into a second area value that matches area of the touch sensitive region and is larger than the first area value; the step of projecting the first image, the first image being capable of forming on the touch sensing unit when the second electronic device is in the projection area and the touch sensing unit faces towards the first electronic device includes projecting the first image whose area value is the second area value, being capable of forming the first image on the touch sensing unit when the second electronic device is in the projection area and the touch sensing unit faces towards the first electronic device.

In some embodiments, after judging whether or not a first distance between the first electronic device and the second electronic device is within a predetermined distance range, the method further includes a step of when the first distance is more than a maximum value of the predetermined distance range, altering area of the first image from a first area value into a third area value that matches area of the touch sensitive region, the first area value being larger than the third area value; the step of projecting the first image, the first image being capable of forming on the touch sensing unit when the second electronic device is in the projection area and the touch sensing unit faces towards the first electronic device includes projecting the first image whose area value is the third area value, being capable of forming the first image on the touch sensing unit when the second electronic device is in the projection area and the touch sensing unit faces towards the first electronic device.

In some embodiments, after judging whether or not the first ratio and the second ratio match, the method further includes a step of adjusting ratio of the first image from the first ratio into a third ratio that matches the second ratio according to the second ratio when the first ratio and the second ratio do not match.

In some embodiments, the first electronic device at least has a first projection mode and a second projection mode, prior to determining a first image to be projected; the method further includes a step of determining that the first electronic device is in the first projection mode.

In some embodiments, after determining a second image based on the first image and the first operation information and projecting the second image, the method further includes steps of acquiring a first trigger instruction for switching a projection mode; and executing the first trigger instruction to switch the projection mode of the first electronic device to the second projection mode from the first projection mode.

In some embodiments, the first electronic device has an image acquiring unit, after switching the projection mode of the first electronic device to the second projection mode from the first projection mode, the method further includes steps of determining the second image to be projected; projecting the second image; acquiring second operation information by the image acquiring unit, the second operation information being operation information determined based on gesture information acquired by the image acquiring unit; determining a third image based on the second image and the second operation information; and projecting the third image.

A display control method applied to a second electronic device having a touch sensing unit and capable of communicating with a first electronic device having a projecting unit with a projection area, wherein the method includes steps of acquiring a first operation by the touch sensing unit when the second electronic device is in the projection area, the touch sensing unit faces towards the first electronic device, and a first image acquired by the projecting unit is formed on the touch sensing unit; determining first operation information to which the first operation corresponds, the first operation information at least including a first coordinate information set to which the first operation corresponds; and transmitting the first operation information to the first electronic device, so that the first electronic device can determine and project a second image based on the first operation information and the first image.

In some embodiments, prior to that a first image acquired by the projecting unit is formed on the touch sensing unit, the method further includes a step of determining a first sub touch sensitive region on a touch sensitive region of the touch sensing unit, area of the first sub touch sensitive region being smaller than that of the touch sensitive region.

In some embodiments, the electronic device has a display unit which is overlapped with the touch sensing unit, and determining a first sub touch sensitive region on a touch sensitive region of the touch sensing unit includes in responsive to a detected user input operation, determining the first sub touch sensitive region on the touch sensitive region; and displaying a visual identifier used to label the first sub touch sensitive region on the display unit accordingly based on the first sub touch sensitive region on the touch sensitive region.

In some embodiments, the electronic device has an optical acquiring unit set, which is overlapped with the touch sensing unit, each optical acquiring unit in the optical acquiring unit set is capable of acquiring light intensity information; the step of determining a first sub touch sensitive region on a touch sensitive region of the touch sensing unit includes determining, in the optical acquiring unit set, a first optical acquiring unit subset whose acquired light intensity information is first light intensity information and a second optical acquiring unit subset whose acquired light intensity information is second light intensity information, the first light intensity information being different from the second light intensity information; determining a first subset region to which the first optical acquiring unit subset corresponds in the optical acquiring unit set; and determining the first sub touch sensitive region in the touch sensitive region accordingly based on the first subset region.

In some embodiments, the first optical acquiring unit subset includes M optical acquiring units, the second optical acquiring unit subset includes N optical acquiring units, M is a positive integer, N is an integer not less than zero, after determining a first sub touch sensitive region on a touch sensitive region of the touch sensing unit, the method further includes steps of acquiring third light intensity information by P optical acquiring units in the optical acquiring unit set, and acquiring fourth light intensity information by remaining M+N−P optical acquiring units in the optical acquiring unit sets, P being a positive integer; judging whether or not a third optical acquiring unit subset formed by the P optical acquiring units is the same as the first optical acquiring unit subset; determining a second subset region to which the third optical acquiring subset corresponds in the optical acquiring unit set when the third optical acquiring unit subset is different from the first optical acquiring unit subset; and re-determining the first sub touch sensitive region in the touch sensitive region according to the second subset region.

In some embodiments, the step of determining first operation information to which the first operation corresponds, the first operation information at least including a first coordinate information set to which the first operation corresponds includes a step of determining the first operation information to which the first operation corresponds in the first sub touch sensitive region, the first operation information at least including the first coordinate information set to which the first operation corresponds in the first sub touch sensitive region.

In some embodiments, the step of determining first operation information to which the first operation corresponds includes detecting and determining a positive direction of the first image, and determining the first operation information to which the first operation corresponds according to the positive direction.

An electronic device having a projecting unit with a projection area and capable of communicating with a second electronic device having a touch sensing unit, wherein the electronic device includes a first determining module for determining a first image to be projected; the projecting unit for projecting the first image, the first image being capable of forming on the touch sensing unit when the second electronic device is in the projection area and the touch sensing unit faces towards the first electronic device, and projecting a second image; a receiving module for receiving first operation information transmitted by the second electronic device, the first operation information being information acquired by the second electronic device in response to a first operation performed by a user on the touch sensing unit; and a second determining module for determining the second image based on the first image and the first operation information.

In some embodiments, the electronic device further includes a third determining module and a first judging module; the third determining module for determining a first ratio of the first image, and a second ratio of a touch sensitive region of the touch sensing unit; the first judging module for judging whether or not the first ratio and the second ratio match; the projecting unit is specifically for projecting the first image when the first ratio and the second ratio match, the first image being capable of forming on the touch sensing unit when the second electronic device is in the projection area and the touch sensing unit faces towards the first electronic device.

In some embodiments, the electronic device further includes a second judging module for judging whether or not a first distance between the first electronic device and the second electronic device is within a predetermined distance range; the projecting unit is specifically for projecting the first image when the first distance is within the predetermined distance range, the first image being capable of forming on the touch sensing unit when the second electronic device is in the projection area and the touch sensing unit faces towards the first electronic device.

In some embodiments, the electronic device further includes an altering module for, when the first distance is less than a minimum value of the predetermined distance range, altering area of the first image from a first area value into a second area value that matches area of the touch sensitive region and is larger than the first area value; the projecting unit is specifically for projecting the first image whose area value is the second area value, the first image being capable of forming on the touch sensing unit when the second electronic device is in the projection area and the touch sensing unit faces towards the first electronic device.

In some embodiments, the electronic device further includes an altering module for, when the first distance is more than a maximum value of the predetermined distance range, altering area of the first image from a first area value into a third area value that matches area of the touch sensitive region, the first area value being larger than the third area value; the projecting unit is specifically for projecting the first image whose area value is the third area value, the first image being capable of forming on the touch sensing unit when the second electronic device is in the projection area and the touch sensing unit faces towards the first electronic device.

In some embodiments, the electronic device further includes an adjusting module for, when the first ratio and the second ratio do not match, adjusting ratio of the first image from the first ratio into a third ratio that matches the second ratio according to the second ratio.

In some embodiments, the first electronic device at least has a first projection mode and a second projection mode, the electronic device further includes a fourth determining module for determining that the first electronic device is in the first projection mode.

In some embodiments, the electronic device further includes a first acquiring module and an executing module; the first acquiring module for acquiring a first trigger instruction for switching a projection mode; and the executing module for executing the first trigger instruction to switch the projection mode of the first electronic device to the second projection mode from the first projection mode.

In some embodiments, the first electronic device has an image acquiring unit, the electronic device further includes a second acquiring module; the first determining module further for determining the second image to be projected; the projecting unit further for projecting the second image and a third image; the second acquiring module for acquiring second operation information by the image acquiring unit, the second operation information being operation information determined based on gesture information acquired by the image acquiring unit; and the second determining module is further for determining the third image based on the second image and the second operation information.

An electronic device having a touch sensing unit and capable of communicating with a first electronic device having a projecting unit with a projection area, wherein the electronic device includes a third acquiring module for acquiring a first operation by the touch sensing unit when the second electronic device is in the projection area, the touch sensing unit faces towards the first electronic device, and a first image acquired by the projecting unit is formed on the touch sensing unit; a fifth determining module for determining first operation information to which the first operation corresponds, the first operation information at least including a first coordinate information set to which the first operation corresponds; a transmitting module for transmitting the first operation information to the first electronic device, so that the first electronic device can determine and project a second image based on the first operation information and the first image.

In some embodiments, the electronic device further includes a sixth determining module for determining a first sub touch sensitive region on a touch sensitive region of the touch sensing unit, area of the first sub touch sensitive region being smaller than that of the touch sensitive region.

In some embodiments, the electronic device has a display unit, which is overlapped with the touch sensing unit, the sixth determining module includes a first responding sub-module and a first operating sub-module; the first responding sub-module is for responding to a detected user input operation, and determining the first sub touch sensitive region on the touch sensitive region; and the first operating sub-module for displaying a visual identifier used to label the first sub touch sensitive region on the display unit accordingly based on the first sub touch sensitive region on the touch sensitive region.

In some embodiments, the electronic device has an optical acquiring unit set, which is overlapped with the touch sensing unit, each optical acquiring unit in the optical acquiring unit set is capable of acquiring light intensity information; the sixth determining sub-module includes a first determining sub-module, a second determining sub-module, and a third determining sub-module; the first determining sub-module for determining, in the optical acquiring unit set, a first optical acquiring unit subset whose acquired light intensity information is first light intensity information and a second optical acquiring unit subset whose acquired light intensity information is second light intensity information, the first light intensity information being different from the second light intensity information; the second determining sub-module for determining a first subset region to which the first optical acquiring unit subset corresponds in the optical acquiring unit set; and the third determining sub-module for determining the first sub touch sensitive region in the touch sensitive region accordingly based on the first subset region.

In some embodiments, the first optical acquiring unit subset includes M optical acquiring units, the second optical acquiring unit subset includes N optical acquiring units, M is a positive integer, N is an integer not less than zero, the electronic device further includes an operating module, a third judging module, a seventh determining module, and an eighth determining module; the operating module for acquiring third light intensity information by P optical acquiring units in the optical acquiring unit set, and acquiring fourth light intensity information by remaining M+N-P optical acquiring units in the optical acquiring unit sets, P being a positive integer; the third judging module for judging whether or not a third optical acquiring unit subset formed by the P optical acquiring units is the same as the first optical acquiring unit subset; the seventh determining module for determining a second subset region to which the third optical acquiring subset corresponds in the optical acquiring unit set when the third optical acquiring unit subset is different from the first optical acquiring unit subset; and the eighth determining module for re-determining the first sub touch sensitive region in the touch sensitive region according to the second subset region.

In some embodiments, the fifth determining module is specifically for determining the first operation information to which the first operation corresponds in the first sub touch sensitive region, the first operation information at least including the first coordinate information set to which the first operation corresponds in the first sub touch sensitive region.

In some embodiments, the electronic device further includes a ninth determining module for detecting and determining a positive direction of the first image, and the fifth determining unit for determining the first operation information to which the first operation corresponds according to the positive direction.

The display method in the embodiments of the present disclosure can be applied to a first electronic device having a projecting unit with a projection area and capable of communicating with a second electronic device having a touch sensing unit, wherein the method may include steps of determining a first image to be projected; projecting the first image, the first image being capable of forming on the touch sensing unit when the second electronic device is in the projection area and the touch sensing unit faces towards the first electronic device; receiving first operation information transmitted by the second electronic device, the first operation information being information acquired by the second electronic device in response to a first operation performed by a user on the touch sensing unit; determining a second image based on the first image and the first operation information; and projecting the second image.

In the embodiments of the present disclosure, when the first electronic device needs to project, it can project the first image to be projected onto the touch sensing unit of the second electronic device, so that when the user needs to operate the first image, he/she can directly operate on the touch sensing unit, the second electronic device can transmit the acquired first operation information to the first electronic device, and the first electronic device can respond based on the first operation information. In such way, because the user can directly operate on the touch sensing unit, the user can more accurately operate an object to be operated on the touch sensing unit, and the touch sensing unit can also determine more accurate operation information according to the user' operation, thereby the first electronic device can more accurately respond according to the operation information, which obviously reduces the rate of error response of the first electronic device, and the user can also obtain a desired result more quickly, and it is not necessary to operate multiple times, and for the user, it saves time, improves operation efficiency, and improves user experience. Meanwhile, because it is not necessary to operate multiple times, the electronic device will not have to respond multiple times, aim can be achieved only by responding one time, which reduces the burden on the electronic device.

DETAILED DESCRIPTION

The display method in the embodiments of the present disclosure can be applied to a first electronic device having a projecting unit with a projection area and capable of communicating with a second electronic device having a touch sensing unit, wherein the method may include steps of determining a first image to be projected; projecting the first image, the first image being capable of forming on the touch sensing unit when the second electronic device is in the projection area and the touch sensing unit faces towards the first electronic device; receiving first operation information transmitted by the second electronic device, the first operation information being information acquired by the second electronic device in response to a first operation performed by a user on the touch sensing unit; determining a second image based on the first image and the first operation information; and projecting the second image.

In the embodiments of the present disclosure, when the first electronic device needs to project, it can project the first image to be projected onto the touch sensing unit of the second electronic device, so that when the user needs to operate the first image, he/she can directly operate on the touch sensing unit, the second electronic device can transmit the acquired first operation information to the first electronic device, and the first electronic device can respond based on the first operation information. In such way, because the user can directly operate on the touch sensing unit, the user can more accurately operate an object to be operated on the touch sensing unit, and the touch sensing unit can also determine more accurate operation information according to the user' operation, thereby the first electronic device can more accurately respond according to the operation information, which obviously reduces the rate of error response of the first electronic device, and the user can also obtain a desired result more quickly, and it is not necessary to operate multiple times, and for the user, it saves time, improves operation efficiency, and improves user experience. Meanwhile, because it is not necessary to operate multiple times, the electronic device will not have to respond multiple times, aim can be achieved only by responding one time, which reduces the burden on the electronic device.

Figure 1A:
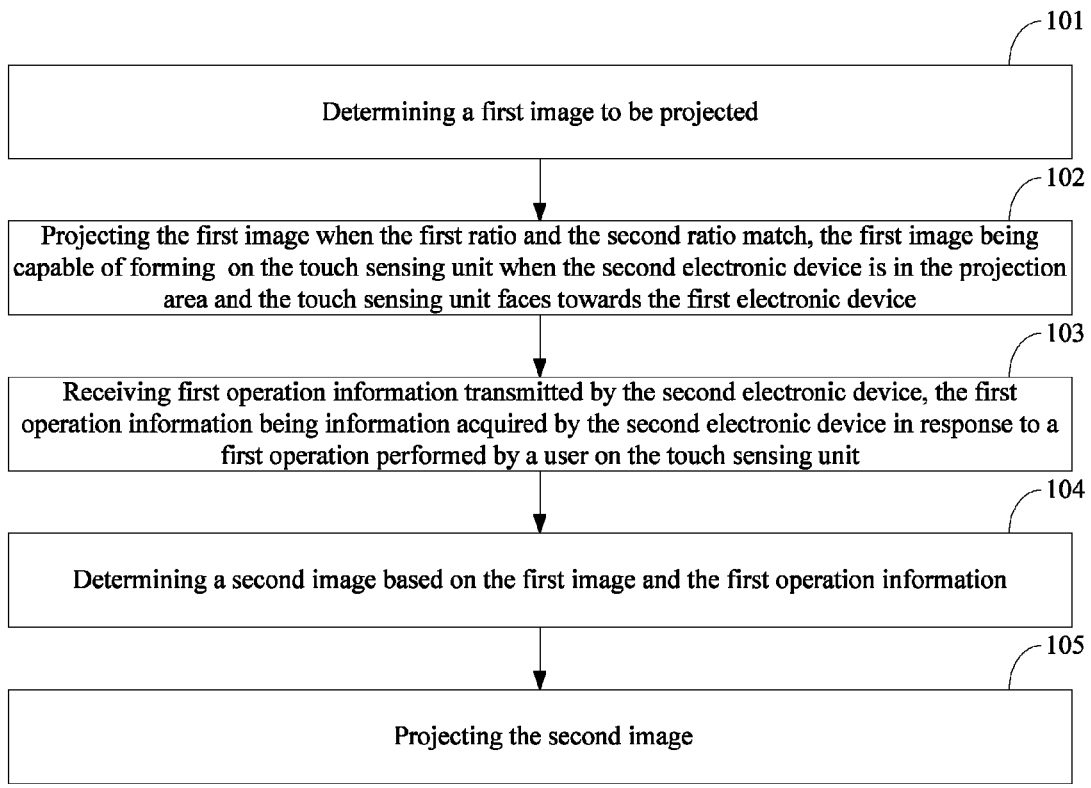
FIG. 1A is a diagram of main flows of the display method in the embodiments of the present disclosure.

Referring to FIG. 1A, an embodiment of present disclosure discloses a display method, which may be applied to a first electronic device having a projecting unit with a projection area and capable of communicating with a second electronic device having a touch sensing unit. The main flows of the method are as follows:

Step 101: determining a first image to be projected.

When the first electronic device needs to project, content that waits to be projected may be first determined, i.e., determining a first image to be projected.

In the embodiment of the present disclosure, the first electronic device may be different electronic devices such as a PC (personal computer), a mobile phone, a PAD (Tablet computer) etc., so long as the first electronic device includes the projecting unit or the first electronic device is connected to the projecting unit, the present disclosure makes no limitation thereto.

The electronic device according to the embodiment of the present disclosure having the projecting unit may refer to that the projecting unit is within the electronic device, i.e., the projecting unit is an integral part of the electronic device, or may refer to that the projecting unit is connected to the electronic device, but the projecting unit and the electronic device are two independent devices.

In the embodiment of the present disclosure, the second electronic device may be different electronic devices such as a PC (personal computer), a mobile phone, a PAD (tablet computer), a smart TV, or a smart table etc., so long as the second electronic device has the touch sensing unit, the present disclosure makes no limitation thereto. The second electronic device may be a small-size electronic device whose touch sensing unit is also small, such as a mobile phone, a PAD etc., or may be a large-size electronic device whose touch sensing unit is small, such as a notebook, whose touchpad that is typically of a small size can be taken as the touch sensing unit, or the second electronic device may be a large-size electronic device whose touch sensing unit also is large, such as a large smart TV, an AIO (all-in-one machine), a smart table etc., the present disclosure makes no limitation thereto.

In the embodiment of the present disclosure, the first electronic device may at least have a first projection mode and a second projection mode. The first projection mode may be projecting in the case of having the second electronic device, in which case it can be projected onto the touch sensing unit of the second electronic device, and the second projection mode may be projecting in the case of not having the second electronic device, in which case it may be projected onto other carriers.

In the embodiment of the present disclosure, prior to step 101, a projection mode of the first electronic device may be determined first.

Alternatively, if it is determined that the projection mode of the first electronic device is the first projection mode, then the first image may be determined, subsequent steps 102, 103, and 104 may proceed accordingly after determining the first image.

Alternatively, if it is determined that the projection mode of the first electronic device is the second projecting mode, then the first image may be determined, the first image may be projected onto a corresponding projection carrier after determining the first image, for example, the projection carrier probably has no responding capability per se, the projection carrier for example may be a wall, a projection screen, a desk etc.

In this case, the first electronic device may have an image acquiring unit, and the image acquiring unit may be for example a camera, or also other function units having an image acquiring function.

If the user wants to operate the first image, the user may perform a corresponding operation directly on the projection carrier panel of the projection carrier, in which case the user can make a specific operation directly on the projection carrier panel, or make a spatial gesture operation, in which case the image acquiring unit can collect user's gesture information, and a corresponding response is made according to the user's gesture information.

For example, when the user performs a first operation, which is a spatial gesture operation in this embodiment, the first electronic device may acquire the first operation by the image acquiring unit, respond to the first operation after acquiring the first operation, and determine first operation information to which the first operation corresponds. The first operation information may include first coordinate set information to which the first operation corresponds, operation process information of the first operation, and so on. The first electronic device may generate a first operation instruction based on the first operation information, determine a second image different from the first image by executing the first operation instruction, project the second image after determining the second image, and continuously project on the projection carrier, in this case the second image instead of the first image will be formed on the projection carrier.

Step 102: projecting the first image, the first image being capable of forming on the touch sensing unit when the second electronic device is in the projection area and the touch sensing unit faces towards the first electronic device.

In the embodiment of the present disclosure, a communication can be made between the first electronic device between and the second electronic device, i.e., a communication connection is established between the first electronic device and the second electronic device. The communication connection may be established between the two electronic devices in advance before the first electronic device projects, or the communication connection may be also established between the two electronic devices after the first electronic device projects. Specifically, there are multiple ways to establish the communication connection; the present disclosure makes no limitation thereto. Moreover, the communication connection may take many forms, may be a wired connection or a wireless connection, or may be also optically transmitting data used for the establishment by an optical way and establishing the communication connection, and so on; the present disclosure makes no limitation thereto.

The projecting unit may project the first image after determining the first image, wherein the projecting unit may project the first image onto a projection carrier.

In the embodiment of the present disclosure, the projection carrier may be the touch sensing unit of the second electronic device.

When the second electronic device is in the projection area of the projecting unit and the touch sensing unit faces towards the first electronic device, the first electronic device can project the first image onto the touch sensing unit, i.e., the first image can be formed on the touch sensing unit.

In some embodiments, in the embodiment of the present disclosure, prior to projecting the first image, the first electronic device may first determine a first ratio of the first image, and a second ratio of a touch sensitive region of the touch sensing unit.

Specifically, the first electronic device may have an image acquiring unit, the image acquiring unit for example may be a camera, or may be other function units having an image acquiring function. When determining the second ratio of the touch sensitive region of the touch sensing unit, the first electronic device can collect an image in the touch sensitive region by the image acquiring unit, and learn the second ratio to which the touch sensitive region corresponds by analyzing the image in the touch sensitive region.

After determining the first ratio and the second ratio, the first electronic device may judge whether or not the first ratio and the second ratio match. In the embodiment of the present disclosure, a match may refer to being the same or other matching modes.

For example, if the first ratio is 4:3 and the second ratio is 4:3, then the first electronic device can determine the first ratio and the second ratio match, and if the first aspect ratio is 16:9 and the second ratio is 4:3, then the first electronic device can determine that the first ratio and the second ratio do not match.

In the embodiment of the present disclosure, if it is determined that the first ratio and the second ratio match, then the first electronic device can project the first image, in this way, when the second electronic device is in the projection area and the touch sensing unit faces towards the first electronic device, the first image can be formed on the touch sensing unit.

In the embodiment of the present disclosure, if it is determined that the first ratio and the second ratio do not match, the first electronic device can adjust ratio of the first image according to the second ratio, for example, the ratio of the first image may be adjusted from the first ratio into a third ratio that is different from the first ratio and matches the second ratio. For example, the first ratio of 16:9 and the second ratio is 4:3, the first electronic device determines that the first ratio and the second ratio are different, then the first electronic device may adjust the ratio of the first image based on the first ratio, such as the first electronic device may adjust the ratio of the first image from the first ratio into a third ratio different from the first ratio, the third ratio may be 4:3, so that the third ratio is the same as the second ratio.

After adjusting the ratio of the first image from the first ratio into the third ratio, the first electronic device may project the first image, in this way, when the second electronic device is in the projection area and the touch sensing unit faces towards the first electronic device, the first image can be formed on the touch sensing unit. Because the third ratio of the first image matches the second ratio of the touch sensing unit, the first image can be projected exactly on the touch sensing unit, and it will not affect the user's viewing on the first image due to a mismatch of ratio.

In some embodiments, in the embodiment of the present disclosure, after judging whether or not the first ratio and the second ratio match, the first electronic device may further judge whether or not a distance between the first electronic device and the second electronic device is within a predetermined distance range.

Generally, when the distance between two electronic devices is within the predetermined distance range, the first image projected by the first electronic device can be exactly projected onto the touch sensing unit, the size can exactly match.

If the first distance is less than a minimum value of the predetermined distance range, then when the first image is projected onto the touch sensing unit, size of the first image probably becomes smaller for the touch sensing unit, which results in that it cannot be exactly projected on the touch sensing unit, area of the touch sensing unit fails to be rationally used.

If the first distance is more than a maximum value of the predetermined distance range, then when the first image is projected onto the touch sensing unit, size of the first image probably become larger for the touch sensing unit, which results in that it cannot be exactly projected on the touch sensing unit, some of the projected content may fall outside of the touch sensing unit, if the user wants to operate this part of the projected content, it is probably impossible to operate.

Thus, if it is determined that the first distance is less than a minimum value of the predetermined distance range, the first electronic device may alter area of the first image from a first area value into a second area value that matches area of the touch sensitive region and is larger than the first area value. In this way, the area of the first image is increased, as for what size the area is increased to in particular, it subjects to that the first image can be exactly projected on the touch sensing unit, that is, the area of the first image is made to be the same as that of the touch sensitive region of the touch sensing unit as much as possible, so that the user can operate the first image on the touch sensing unit, no operation blind area would appear, and the touch sensitive region is used rationally.

If it is determined that the first distance is more than a maximum value of the predetermined distance range, the first electronic device may alter area of the first image from a first area value into a third area value that matches area of the touch sensitive region, the first area value being larger than the third area value. In this way, the area of the first image is decreased, as for what size the area is decreased to in particular, it subjects to that the first image can be exactly projected on the touch sensing unit, that is, the area of the first image is made to be the same as that of the touch sensitive region of the touch sensing unit as much as possible, so that the user can operate the first image on the touch sensing unit, no operation blind area would appear, and the touch sensitive region is used rationally.

Step 103: receiving first operation information transmitted by the second electronic device, the first operation information being information acquired by the second electronic device in response to a first operation performed by a user on the touch sensing unit.

After the first electronic device projects the first image onto the touch sensing unit, the user may want to operate the first image. The user may operate the first image directly on the touch sensing unit, after the user performs the first operation on the touch sensing unit, the touch sensing unit may acquire the first operation, the second electronic device may respond to the first operation, and acquire the first operation information relative to the first operation based on the first operation.

In the embodiment of the present disclosure, the first operation information may at least include a first coordinate information set to which the first operation corresponds.

After acquiring the first operation information, the second electronic device may transmit the first operation information to the first electronic device, so that the first electronic device may acquire the first operation information transmitted by the second electronic device.

The first electronic device can actively acquire the first operation information from the second electronic device, for example, the first electronic device may access the second electronic device in real time, periodically or when being triggered, to learn whether or not there is the first operation information in the second electronic device, if so, then the first electronic device can acquire the first operation information from the second electronic device.

Alternatively, the first electronic device can passively acquire the first operation information, for example, the second electronic device may actively transmit the first operation information to the first electronic device when acquiring the first operation information, it is not necessary for the first electronic device to access the second electronic device.

Step 104: determining a second image based on the first image and the first operation information; and projecting the second image.

After acquiring the first operation information, the first electronic device may determine a corresponding first operation instruction based on the first operation information, and thereby determine the second image based on the first operation instruction and the first image, and project the second image. When projecting the second image, the second image may still be projected onto the touch sensing unit; in this case, the first image is replaced with the second image.

For example, the first electronic device may be a handheld electronic device having the projecting unit, and the first image may be a main interface of the handheld electronic device, the user performs a double-click operation with regard to a first icon in the first image on the touch sensing unit, for example, the first icon is an icon to which the Word application corresponds, the second electronic device may acquire the first operation information corresponding to the double-click operation, and transmit the first operation information to the first electronic device after acquiring the first operation information. The first electronic device may generate the first operation instruction, which can be used to invoke the Word application based on the first operation information after acquiring the first operation information. After generating the first operation instruction, the first electronic device may execute the first operation instruction to invoke the Word application, in this case, the first electronic device may determine the second image, which is an image to which the Word application corresponds, and continue to project the second image. Here, the second image instead of the first image will be formed on the touch sensing unit.

In some embodiments, in the embodiment of the present disclosure, after projecting the second image, the first electronic device may acquire a first trigger instruction for switching a projection mode.

For example, after the second image is projected, the second electronic device and the first electronic device cannot communicate any more, then when the first electronic device disconnects the second electronic device, it is equivalent to that the first electronic device acquires the first trigger instruction, or after the second image is projected, the user performs a corresponding operation on the first electronic device or the second electronic device, for example, a corresponding button is pressed, then it is equivalent to that the first electronic device acquires the first trigger instruction, and the like.

After acquiring the first trigger instruction, the first electronic device may execute the first trigger instruction to switch the projection mode of the first electronic device to the second projection mode from the first projection mode.

After it is determined that the projection mode of the first electronic device is the second projection mode, the second image to be projected may be determined, the second image may be projected to a corresponding projection carrier after being determined, for example, the projection carrier probably has no responding ability per set, the projector carrier for example may be a wall, a projection screen, a desk, and so on.

In this case, the first electronic device may have the image acquiring unit.

If the user wants to operate the second image, the user may perform a corresponding operation directly on the projection carrier panel of the projection carrier, in which case the user can make a specific operation directly on the projection carrier panel, or make a spatial gesture operation, in which case the image acquiring unit can collect user's gesture information, and a corresponding response is made according to the user's gesture information.

For example, when the user performs a second operation, which is a spatial gesture operation in this embodiment, the first electronic device may acquire the second operation by the image acquiring unit, respond to the second operation after acquiring the second operation, and determine second operation information to which the second operation corresponds, in particular, the first electronic device may determine the second operation information according to the gesture information acquired by the image acquiring unit. The second operation information may include second coordinate set information to which the second operation corresponds, operation process information of the second operation, and so on, the first electronic device may generate a second operation instruction based on the second operation information, determine a third image different from the second image by executing the second operation instruction, project the third image after determining the third image, and continuously project on the projection carrier, in this case, the third image instead of the second image will be formed on the projection carrier.

The display method in the present disclosure will be described below through several specific embodiments; the following embodiments mainly describe several possible scenarios of the previously mentioned method. It should be noted that the embodiments of the present disclosure are only for explaining the present disclosure, and not intended to limit the present disclosure. Embodiments that comply with the concept of the present disclosure all are within the scope of the present disclosure; a personal skilled in the art naturally knows how to make a variant according to the concept of the present disclosure.

First Embodiment

The first electronic device is a handheld electronic device, and the second electronic device is a smart TV. The first electronic device has a projecting unit, and the second electronic device has a touch sensing unit. For example, the handheld electronic device may be different electronic devices such as a mobile phone, a PAD, and so on.

Figure 1B:
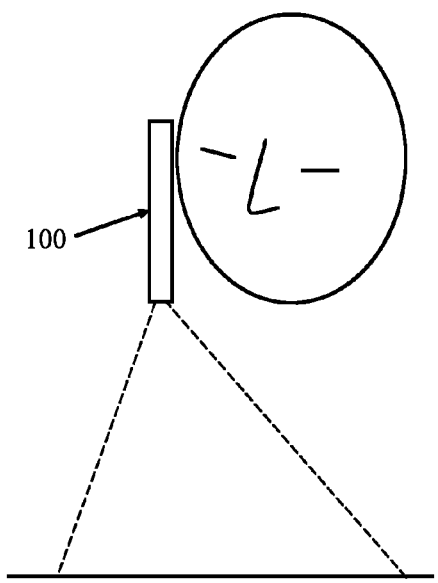
FIG. 1B is a schematic diagram of scenario when a handheld electronic device is used to project in the embodiments of the present disclosure.

The projection scenario in this embodiment may be the handheld electronic device has a sound outputting unit and a sound acquiring unit, which are provided respectively at both ends of the handheld electronic device. A projection direction of the projecting unit is the same as a first direction, which is a direction from the sound outputting unit to the sound acquiring unit. Specifically, it may be that the projecting unit is provided near the sound acquiring unit, and projects to a direction away from the sound acquiring unit. That is, the scenario of projecting when making a call. The intended use of this embodiment is to enable the user to watch the projected content while making a call, and thereby operate the projected content through the second electronic device, so that the calling is not affected and projected content can be operated conveniently, which facilitates using of the user. As shown in FIG. 1B, in which 100 is a handheld electronic device, it can be seen that the user is making a call by using the handheld electronic device. Dashed lines in FIG. 1B show the projection area of the projecting unit, a horizontal line shown with a solid line is the touch sensing unit of the second electronic device. It can be seen that the user can watch the projected content while making a call.

When the first electronic device needs to project, content that waits to be projected may be first determined, i.e., determining a first image to be projected. The first image in this embodiment is a main interface of the handheld device.

After determining the first image, the first electronic device may first determine a first ratio of the first image, and a second ratio of a touch sensitive region of the touch sensing unit.

In this embodiment, the first electronic device may have an image acquiring unit, which for example is a camera. The first electronic device can collect an image in the touch sensitive region by the image acquiring unit, and learn the second ratio to which the touch sensitive region corresponds by analyzing the image in the touch sensitive region.

After determining the first ratio and the second ratio, the first electronic device may judge whether or not the first ratio and the second ratio match. In the embodiment of the present disclosure, a match may refer to being the same or other matching modes.

In this embodiment, it is determined that the first aspect ratio is 16:9 and the second ratio is 4:3, then the first electronic device can determine that the first ratio and the second ratio do not match.

The first electronic device may adjust ratio of the first image according to the second ratio, for example, adjust the ratio of the first image from the first ratio into a third ratio that is different from the first ratio and matches the second ratio.

For example, the third ratio in this embodiment is 4:3, i.e., the ratio of the first image is adjusted to be the same as that of the touch sensitive unit in this embodiment.

After adjusting the ratio of the first image from the first ratio into the third ratio, the first electronic device may project the first image, in this embodiment, when the second electronic device is in the projection area and the touch sensing unit faces towards the first electronic device, the first image can be formed on the touch sensing unit.

The first image may be a main interface of the handheld electronic device, the user performs a double-click operation with regard to a first icon in the first image on the touch sensing unit, for example, the first icon is an icon to which the Excel application corresponds, the second electronic device may acquire the first operation information corresponding to the double-click operation, and transmit the first operation information to the first electronic device after acquiring the first operation information. The first electronic device may generate the first operation instruction, which can be used to invoke the Excel application based on the first operation information after acquiring the first operation information. After generating the first operation instruction, the first electronic device may execute the first operation instruction to invoke the Excel application, in this case, the first electronic device may determine the second image, which is an image to which the Excel application corresponds, and continue to project the second image. Here, the second image instead of the first image will be formed on the touch sensing unit.

Second Embodiment

The first electronic device is a handheld electronic device, which is a mobile phone in this embodiment, and the second electronic device is a smart TV. The first electronic device has a projecting unit, and the second electronic device has a touch sensing unit.

The projection scenario in this embodiment may be the mobile phone has a sound outputting unit and a sound acquiring unit, which are provided respectively at both ends of the mobile phone. A projection direction of the projecting unit is the same as a first direction, which is a direction from the sound outputting unit to the sound acquiring unit. Specifically, it may be that the projecting unit is provided near the sound acquiring unit, and projects to a direction away from the sound acquiring unit. That is, the scenario of projecting when making a call. The intended use of this embodiment is to enable the user to watch the projected content while making a call, and thereby operate the projected content through the second electronic device, so that the calling is not affected and projected content can be operated conveniently, which facilitates using of the user.

When the first electronic device needs to project, a projection mode of the first electronic device may be determined first. In this embodiment, the first electronic device may at least have a first projection mode and a second projection mode. The first projection mode may be projecting in the case of having the second electronic device, in which case it can be projected onto the touch sensing unit of the second electronic device, and the second projection mode may be projecting in the case of not having the second electronic device, in which case it may be projected onto other carriers.

In this embodiment, it is determined that the projection mode of the first electronic device is a first projection mode.

After determining that the projection mode is the first projection mode, the first electronic device may determine content that waits to be projected, i.e., determining a first image to be projected.

After determining the first image, the first electronic device may first determine a first ratio of the first image, and a second ratio of a touch sensitive region of the touch sensing unit.

In this embodiment, the first electronic device may have an image acquiring unit, which for example is a camera. The first electronic device can collect an image in the touch sensitive region by the image acquiring unit, and learn the second ratio to which the touch sensitive region corresponds by analyzing the image in the touch sensitive region.

After determining the first ratio and the second ratio, the first electronic device may judge whether or not the first ratio and the second ratio match. In the embodiment of the present disclosure, a match may refer to being the same.

In this embodiment, it is determined that the first ratio is 16:9 and the second ratio is 4:3, the first electronic device can determine that the first ratio and the second ratio do not match.

The first electronic device may adjust ratio of the first image according to the second ratio, for example, adjust the ratio of the first image from the first ratio into a third ratio that is different from the first ratio and matches the second ratio.

For example, the third ratio in this embodiment is 4:3, i.e., the ratio of the first image is adjusted to be the same as that of the touch sensitive unit in this embodiment.

After adjusting the ratio of the first image into the third ratio, the first electronic device may further judge whether or not a distance between the first electronic device and the second electronic device is within a predetermined distance range.

In this embodiment, it is determined that the first distance is less than a minimum value of the predetermined distance range, the first electronic device may alter area of the first image from a first area value into a second area value that matches area of the touch sensitive region and is larger than the first area value. In this way, the area of the first image is increased, as for what size the area is increased to in particular, it subjects to that the first image can be exactly projected on the touch sensing unit, that is, the area of the first image is made be the same as that of the touch sensitive region of the touch sensing unit as much as possible, so that the user can operate the first image on the touch sensing unit, no operation blind area would appear, and the touch sensitive region is used rationally.

After adjusting the ratio of the first image into the third ratio and adjusting the area value of the first image into the second area value, the first electronic device may project the first image, in this embodiment, when the second electronic device is in the projection area and the touch sensing unit faces towards the first electronic device, the first image can be formed on the touch sensing unit.

The first image may be a main interface of the mobile phone, the user performs a first operation, which is a double-click operation in this embodiment, with regard to a first icon in the first image on the touch sensing unit, for example, the first icon is an icon to which the Address Book application corresponds, the second electronic device may acquire the first operation information corresponding to the double-click operation, and transmit the first operation information to the first electronic device after acquiring the first operation information. The first electronic device may generate the first operation instruction, which can be used to invoke the Address Book application based on the first operation information after acquiring the first operation information. After generating the first operation instruction, the first electronic device may execute the first operation instruction to invoke the Address Book application, in this case, the first electronic device may determine the second image, which is an image to which the Address Book application corresponds, and continue to project the second image. Here, the second image instead of the first image will be formed on the touch sensing unit.

Third Embodiment

The first electronic device is a handheld electronic device, which is a mobile phone in this embodiment; the second electronic device is an AIO or a smart table that is placed horizontally. The first electronic device has a projecting unit, and the second electronic device has a touch sensing unit.

The projection scenario in this embodiment may be the mobile phone has a sound outputting unit and a sound acquiring unit, which are provided respectively at both ends of the mobile phone. A projection direction of the projecting unit is the same as a first direction, which is a direction from the sound outputting unit to the sound acquiring unit. Specifically, it may be that the projecting unit is provided near the sound acquiring unit, and projects to a direction away from the sound acquiring unit. That is, the scenario of projecting when making a call. The intended use of this embodiment is to enable the user to watch the projected content while making a call, and thereby operate the projected content through the second electronic device, so that the calling is not affected and projected content can be operated conveniently, which facilitates using of the user.

When the first electronic device needs to project, a projection mode of the first electronic device may be determined first. In this embodiment, the first electronic device may at least have a first projection mode and a second projection mode. The first projection mode may be projecting in the case of having the second electronic device, in which case it can be projected onto the touch sensing unit of the second electronic device, and the second projection mode may be projecting in the case of not having the second electronic device, in which case it may be projected onto other carriers.

In this embodiment, it is determined that the projection mode of the first electronic device is a first projection mode.

After determining that the projection mode is the first projection mode, the first electronic device may determine content that waits to be projected, i.e., determining a first image to be projected.

After determining the first image, the first electronic device may first determine a first ratio of the first image, and a second ratio of a touch sensitive region of the touch sensing unit.

In this embodiment, the first electronic device may have an image acquiring unit, which for example is a camera. The first electronic device can collect an image in the touch sensitive region by the image acquiring unit, and learn the second ratio to which the touch sensitive region corresponds by analyzing the image in the touch sensitive region.

After determining the first ratio and the second ratio, the first electronic device may judge whether or not the first ratio and the second ratio match. In the embodiment of the present disclosure, a match may refer to being the same.

In this embodiment, it is determined that the first ratio is 16:9 and the second ratio is 4:3, the first electronic device can determine that the first ratio and the second ratio do not match.

The first electronic device may adjust ratio of the first image according to the second ratio, for example, adjust the ratio of the first image from the first ratio into a third ratio that is different from the first ratio and matches the second ratio.

For example, the third ratio in this embodiment is 4:3, i.e., the ratio of the first image is adjusted to be the same as that of the touch sensitive unit in this embodiment.

After adjusting the ratio of the first image into the second ratio, the first electronic device may further judge whether or not a distance between the first electronic device and the second electronic device is within a predetermined distance range.

In this embodiment, it is determined that the first distance is more than a maximum value of the predetermined distance range, the first electronic device may alter area of the first image from a first area value into a third area value that matches area of the touch sensitive region, the first area value being larger than the third area value. In this way, the area of the first image is decreased, as for what size the area is decreased to in particular, it subjects to that the first image can be exactly projected on the touch sensing unit, that is, the area of the first image is made to be the same as that of the touch sensitive region of the touch sensing unit as much as possible, so that the user can operate the first image on the touch sensing unit operation, no operation blind area would appear, and the touch sensitive region is used rationally.

After adjusting the ratio of the first image into the third ratio and adjusting the area value of the first image into the third area value, the first electronic device may project the first image, in this embodiment, when the second electronic device is in the projection area and the touch sensing unit faces towards the first electronic device, the first image can be formed on the touch sensing unit.

The first image may be a main interface of the mobile phone, the user performs a first operation, which is a double-click operation in this embodiment, with regard to a first icon in the first image on the touch sensing unit, for example, the first icon is an icon to which the Email application corresponds, the second electronic device may acquire the first operation information corresponding to the double-click operation, and transmit the first operation information to the first electronic device after acquiring the first operation information. The first electronic device may generate the first operation instruction, which can be used to invoke the Email application based on the first operation information after acquiring the first operation information. After generating the first operation instruction, the first electronic device may execute the first operation instruction to invoke the Email application, in this case, the first electronic device may determine the second image, which is an image to which the Email application corresponds, and continue to project the second image. Here, the second image instead of the first image will be formed on the touch sensing unit.

In this embodiment, after the second image is projected, the second electronic device and the first electronic device cannot communicate any more, then when the first electronic device disconnects the second electronic device, the first electronic device may acquire a first trigger instruction used to switch a projection mode.

After acquiring the first trigger instruction, the first electronic device may execute the first trigger instruction to switch the projection mode of the first electronic device to the second projection mode from the first projection mode.

After it is determined that the projection mode of the first electronic device is the second projection mode, the second image to be projected may be determined, the second image may be projected to a corresponding projection carrier after being determined, the projector carrier is a wall in this embodiment.

If the user wants to operate the second image, the user may perform a corresponding operation directly on the projection carrier panel of the projection carrier, in which case the user can make a specific operation directly on the projection carrier panel, or make a spatial gesture operation, in which case the image acquiring unit can collect user's gesture information, and a corresponding response is made according to the user's gesture information.

The user performs a second operation, which is a spatial gesture operation in this embodiment, the first electronic device may acquire the second operation by the image acquiring unit, respond to the second operation after acquiring the second operation, and determine second operation information to which the first operation corresponds, in particular, the first electronic device may determine the second operation information according to the gesture information acquired by the image acquiring unit. The second operation information may include second coordinate set information to which the second operation corresponds, operation process information of the second operation, and so on. The first electronic device may generate a second operation instruction based on the second operation information, determine a third image different from the second image by executing the second operation instruction, project the second image after determining the second image, and continuously project on the projection carrier, here, the third image instead of the second image will be formed on the projection carrier.

The second image may be an email to which the Email application corresponds, the user performs a selection operation, which is a single-click operation in this embodiment, on one picture in the second image by a spatial gesture, the image acquiring unit may collect and acquire the gesture information to which the second operation corresponds, the first electronic device may analyze the gesture information, and acquires second operation information corresponding to the second operation. After acquiring the second operation information, a second operation instruction which can be used to delete the email in the Email application may be generated according to the second operation information, in this case, the first electric device may determine a third image, which is an image to which the Email application corresponds after the email is deleted, and continue to the project third image. Here, the third image instead of the second image will be formed on the projection carrier.

Figure 2A:
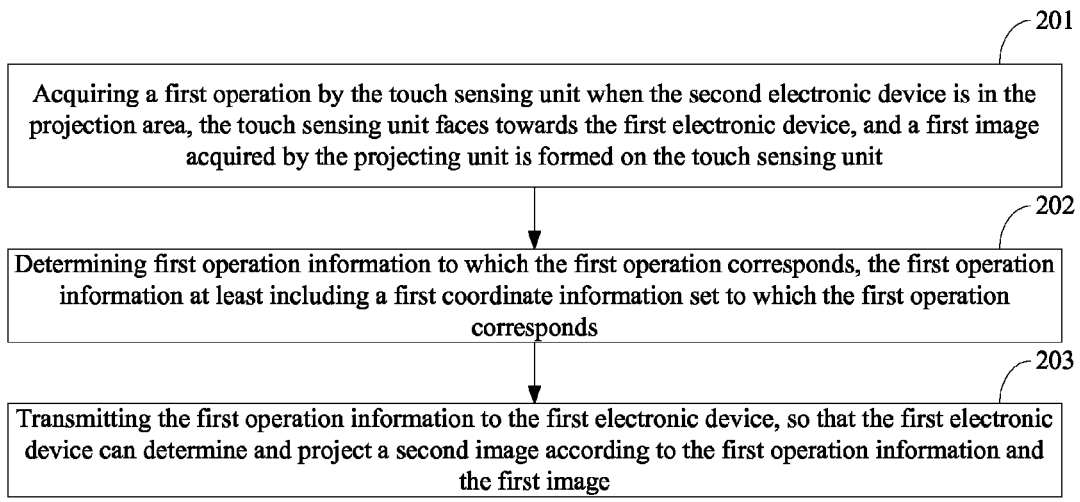
FIG. 2A is a diagram of main flows of the display control method in the embodiments of the present disclosure.

Referring to FIG. 2A, an embodiment of the present disclosure provides a display control method applied to a second electronic device having a touch sensing unit and capable of communicating with a first electronic device having a projecting unit with a projection area, The first electronic device in this embodiment of the present disclosure may be the same electronic device as the first electronic device in the embodiment as shown in FIG. 1, the second electronic device in this embodiment of the present disclosure may be the same electronic device as the second electronic device in the embodiment as shown in FIG. 1. The main flows of the method are as follows:

Step 201: acquiring a first operation by the touch sensing unit when the second electronic device is in the projection area, the touch sensing unit faces towards the first electronic device, and a first image acquired by the projecting unit is formed on the touch sensing unit.

In the embodiment of the present disclosure, when the second electronic device is in the projection area and the touch sensing unit faces towards the first electronic device, if the first electronic device projects, then the first image may be formed on the touch sensing unit.

When the first image is formed on the touch sensing unit, the user may want to operate the first image. The user may perform a first operation directly on the first touch sensing unit, and the second electronic device can acquire the first operation by the touch sensing unit.

In the embodiment of the present disclosure, the second electronic device may directly take the whole touch sensitive region as a display region for projected content of the projecting unit, or take a partial touch sensitive region as a display region for projected content of the projecting unit.

In the embodiment of the present disclosure, if a partial region of the touch sensitive region is taken as a display region for projected content of the projecting unit, then prior to that the first image is formed on the touch sensing unit, the second electronic may first determine a first sub touch sensitive region on the touch sensitive region of the touch sensing unit, wherein area of the first sub touch sensitive region may be smaller than that of the touch sensitive region.

There may be multiple ways to determine the first sub touch sensitive region on the touch sensing unit.

Optionally, one possible way to determine the first sub touch sensitive region on the touch sensing unit may be receiving an input operation from the user, and determining the first sub touch sensitive region by responding to the input operation.

Specifically, the touch sensing unit of the second electronic device may detect itself in real time, periodically, or when being triggered, so as to determine whether or not a user operates on the touch sensing unit. If the second electronic device detects that the user performs the input operation, then the second electronic device may respond to the detected input operation from the user, and determine the first sub touch sensitive region on the touch sensitive region. For example, the user may draw a frame on the touch sensing unit; the second electronic device may determine the region within the frame as the first sub touch sensitive region. For example, the user may determine several points that are not on a straight line on the touch sensing unit, the second electronic device may make a frame according to the points determined by the user, and determine the region within the frame as the first sub touch sensitive region.

In this embodiment, the second electronic device may have a display unit, which may be overlapped with the touch sensing unit. For example, an electronic device at present such as a PC (PC herein refers to a touch-type all-in-one machine, a notebook PC etc.), a PAD, a mobile phone, a smart TV, and so on, usually has a touch display unit, which can be taken as that the touch sensing unit and the display unit are overlapped.

After the first sub touch sensitive region is determined on the touch sensitive region, the second electronic device may display a visual identifier used to label the first sub touch sensitive region on the display unit accordingly based on the first sub touch sensitive region on the touch sensitive region.

For example, after determining the first sub touch sensitive region on the touch sensing unit, the second electronic device may determine, on the display unit, a corresponding position of the first sub touch sensitive region on the display unit based on the first sub touch sensitive region on the touch sensitive region, and thereby display the visual identifier on the corresponding position of the first sub touch sensitive region on the display unit.

For example, the first sub touch sensitive region may be region within a frame, then the second electronic device may display borders of the frame on the display unit, so that the user is aware of that the region within the frame is the first sub touch sensitive region.

Because when the user watches projected content of the projecting unit through the touch sensing unit, the projected content probably is not always within the first sub touch sensitive region, a part or the whole of the projected content probably is outside the first sub touch sensitive region during the projection. However, when the user needs to operate the projected content, the whole projected content probably needs to be moved within the first sub touch sensitive region, for the touch sensing unit can correctly respond to the user' operation only within the first sub touch sensitive region. A visual identifier used to label the first sub touch sensitive region is displayed on the display unit, which facilitates the user determining the position of the first sub touch sensitive region at any time, and adjusting the position of the projected content at any time, so that the user can perform a more accurate operation with regard to the projected content.

Optionally, the electronic device may have an optical acquiring unit set, which may be overlapped with the touch sensing unit, each optical acquiring unit in the optical acquiring unit set is capable of acquiring light intensity information. Another possible way to determine the first sub touch sensitive unit on the touch sensing unit may be determining the first sub touch sensitive unit on the touch sensing unit through the light intensity information acquired by the optical acquiring unit.

Specifically, in the optical acquiring unit set, the light intensity information acquired by each optical acquiring unit may be determined, and thereby the optical acquiring unit set may be divided into two parts, which are a first optical acquiring unit subset and a second optical acquiring unit subset, respectively, the light intensity information acquired by the first optical acquiring unit subset is first light intensity information, and the light intensity information acquired by the second optical acquiring unit subset is second light intensity information, the first light intensity information is different from the second light intensity information, in general, a first light intensity to which the first light intensity information corresponds may be larger than a second light intensity to which the second light intensity information corresponds.

In some embodiments, in the embodiment of the present disclosure, the first light intensity to which the first light intensity information corresponds may be not only a value, but a range of light intensity value, which may be referred to as a first range of light intensity value, all the optical acquiring units whose acquired light intensity values are within the first range of light intensity value may be classified into the first optical acquiring unit subset, and also, the second light intensity to which the second light intensity information corresponds may be not only a value, but a range of light intensity value, which may be referred to as a second range of light intensity value, all the optical acquiring units whose acquired light intensity values are within the second range of light intensity value may be classified into the second optical acquiring unit subset.

After determining the first optical acquiring unit subset and the second optical acquiring unit subset, a first subset region to which the first optical acquiring unit subset corresponds in the optical acquiring unit set may be determined. In the embodiment of the present disclosure, the optical acquiring unit set may correspond to a first set region, the first optical acquiring unit subset may correspond to the first subset region in the first set region, wherein region is a positional concept, i.e. determining the position where each optical acquiring unit in the first optical acquiring unit subset is.

Because the optical acquiring unit set and the touch sensing unit are overlapped, after determining the first subset region, the first sub touch sensitive region may be determined in the touch sensitive region accordingly based on the first subset region.

In the embodiment of the present disclosure, the first optical acquiring unit subset may include M optical acquiring units, the second optical acquiring unit subset may include N optical acquiring units, M is a positive integer, N is an integer not less than zero.

In some embodiments, the second electronic device may monitor the optical acquiring unit in real time, periodically, or when being triggered.

Each optical acquiring unit in the optical acquiring unit set collects light intensity information in real time. After determining the first sub touch sensitive region on the touch sensitive region of the touch sensing unit, third light intensity information is acquired by P optical acquiring units in the optical acquiring unit set, and fourth light intensity information is acquired by remaining M+N-P optical acquiring units in the optical acquiring unit sets, P being a positive integer.

The second electronic device may judge whether or not a third optical acquiring unit subset formed by the P optical acquiring units is the same as the first optical acquiring unit subset.

In the embodiment of the present disclosure, being the same refers to M=P, and what is included in the first optical acquiring unit subset is the P optical acquiring units.

If P is not equal to M, then it may be determined that the third optical acquiring unit subset formed by the P optical acquiring units is not the same as the first optical acquiring unit subset; if P=M, but at least one optical acquiring unit in the P optical acquiring units is not included in the first optical acquiring unit subset, or at least one optical acquiring unit in the first optical acquiring unit subset is not included in the P optical acquiring units, then it may be determined that the third optical acquiring unit subset formed by the P optical acquiring units is not the same as the first optical acquiring unit subset.

If the third optical acquiring unit subset formed by the P optical acquiring units is the same as the first optical acquiring unit subset, then the second electronic device may not perform any operation.

If the third optical acquiring unit subset formed by the P optical acquiring units is not the same as the first optical acquiring unit subset, then the second electronic device may determine that the third optical acquiring unit subset is larger than the second subset region to which the third optical acquiring subset corresponds in the optical acquiring unit set, i.e., determining the position where each optical acquiring unit in the third optical acquiring unit subset is.

In the embodiment of the present disclosure, a communication connection established between the first electronic device and the second electronic device may be a wired connection or a wireless connection, or may be also optically transmitting data used for the establishment by an optical way and establishing the communication connection. In some embodiments, when the electronic device has an optical acquiring unit set, which may be overlapped with the touch sensing unit, the first electronic device and the second electronic device may transmit data used to establish a connection by the optical acquiring unit and establish the communication connection.

For example, after determining the first sub touch sensitive region on the touch sensing region through the acquired light intensity information, the optical acquiring unit set may transmit data used to establish a connection to the first electronic device, and thereby establish the communication connection with the first electronic device, in this way, the second electronic device can establish the communication connection with the first electronic device after it determines that the first sub touch sensitive region is already determined, data can be transmitted through the communication connection after the communication connection is established, the communication connection has less idle time and can be used rationally, and energy waste due to an earlier establishment of the communication connection will not occur in the first electronic device and the second electronic device. In addition, if the communication connection is established with the first electronic device after the optical acquiring unit set determines the first sub touch sensitive region, data loss caused by performing transmission while lacking a communication connection, which is established too late, will not occur when data needs to be transmitted.

Alternatively, for example, the communication connection may be established between the two electronic devices in advance before the first electronic device projects, for example, data used to establish a connection may be transmitted to the first electronic device by the optical acquiring unit set, thereby the communication connection with the first electronic device is established. In this way, it is ensured that there is always a communication connection to perform transmission when the first electronic device and the second electronic device need to transmit data at any time, which effectively avoids data loss.

Furthermore, in the embodiment of the present disclosure, establishing the communication connection by the optical acquiring unit set will not consume too much electric power of the first electronic device and the second electronic device, solar energy is used instead, and the effect of saving energy and protecting environment is achieved.

After determining the second subset region, the first sub touch sensitive region in the touch sensitive region may be re-determined according to the second subset region, at this time; position of the first sub touch sensitive region probably changes.

Step 202: determining first operation information to which the first operation corresponds, the first operation information at least including a first coordinate information set to which the first operation corresponds.

After acquiring the first operation, the second electronic device may determine the first operation information corresponding to the first operation, the first operation information may at least include a first coordinate information set to which the first operation corresponds.

In the embodiment of the present disclosure, if the whole touch sensitive region is a projection region of the first image, that is, if the first image is formed on the whole touch sensitive region, then the second electronic device may determine the first operation information to which the first operation corresponds in the touch sensitive region, the first coordinate set information included in the first operation information may be coordinate set information to which the first operation corresponds in the touch sensing unit. In this case, the first coordinate set information may be taken as absolute coordinate information.

In the embodiment of the present disclosure, if the second electronic device determines in the touch sensitive region that the first sub touch sensitive region as a projection region of the first image, if the first image is formed in the first sub touch sensitive region, then the second electronic device may determine in the first sub touch sensitive region the first operation information to which the first operation corresponds, the first coordinate set information included in the first operation information may be coordinate set information to which the first operation corresponds in the first sub touch sensing unit. In this case, the first coordinate set information may be taken as relative coordinate set information.

In some embodiments, in the embodiment of the present disclosure, prior to determining the first operation information, the second electronic device may first detect and determine a positive direction of the first image, and determine the first operation information to which the first operation corresponds according to the positive direction.

There may be a variety of ways to determine the positive direction of the first image.

Figure 2B:
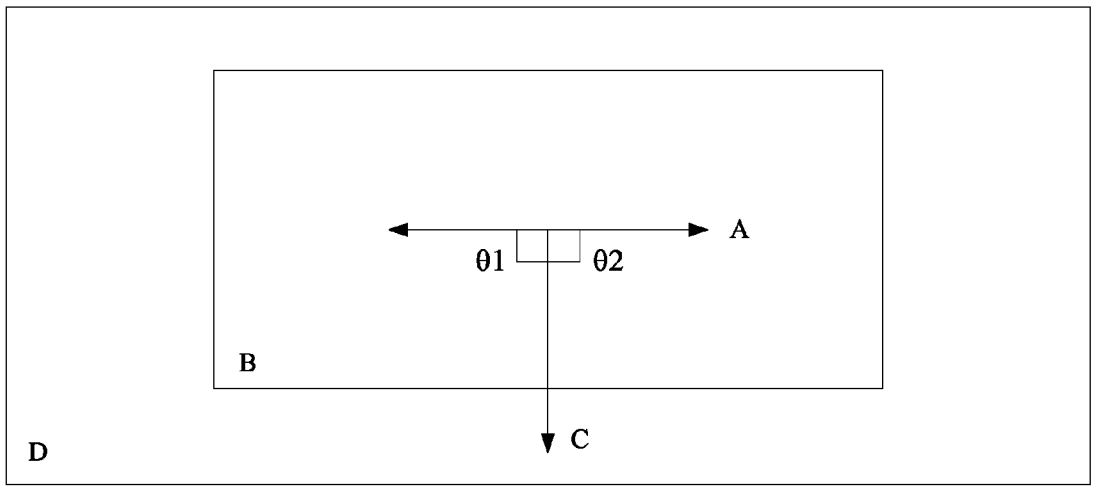
FIG. 2B is schematic diagram of a projection situation in the embodiments of the present disclosure.

Optionally, one possible way to determine the positive direction of the first image may be determining the positive direction of the first image by a gravity direction. This way is more suitable for a scenario in which a plane where the touch sensing unit is located is perpendicular to the horizontal plane. For example, the second electronic device may be a smart TV, a PC, or other electronic devices, a display screen of the smart TV, the PC, or other electronic devices may be taken as the touch sensing unit, and placement of the smart TV, the PC, or other electronic devices determines that a plane where the display screen of the smart TV, the PC, or other electronic devices is located usually is perpendicular to the horizontal plane. As shown in FIG. 2B, wherein A represents a positive direction, B represents the first image, C represents the gravity direction, θ1 represents a first angle, θ2 represents a second angle, the first angle and the second angle are equal, and both are 90°. In FIG. 2B, shape of the first image is schematically a rectangular, and shape of the touch sensing unit is also schematically a rectangular, wherein D represents the touch sensing unit.

Figure 2C:
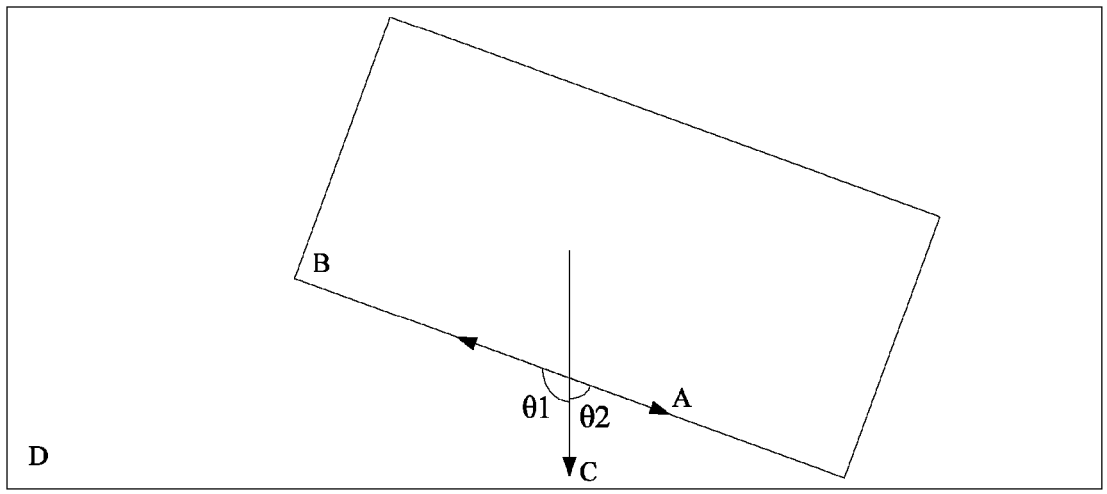
FIG. 2C is schematic diagram of a projection situation in the embodiments of the present disclosure.

After the first image is formed on the touch sensing unit, probably there are two angles between the first image and the gravity direction, which are a first angle and a second angle, respectively, wherein the first angle may be not less than the second angle. If the first image is projected onto the touch sensing unit regularly, the first angle may be equal to the second angle. In this case, the second electronic device may determine a direction parallel to the gravity direction as the positive direction. In some embodiments, the positive direction may be an X-axis positive direction. Sometimes the first image probably is not formed on the touch sensing unit regularly, an inclination to certain extent probably exist. If inclination exists, then the first angle probably is greater than the second angle, then the second electronic device may take an extended direction of the line that constitutes the second angle other than the gravity line as the positive direction. As shown in FIG. 2C, wherein A represents a positive direction, B represents the first image, C represents the gravity direction, θ1 represents the first angle, θ2 represents the second angle, the first angle is larger than and the second angle. In FIG. 2C, shape of the first image is schematically a rectangular, and shape of the touch sensing unit is also schematically a rectangular, wherein D represents the touch sensing unit.

Alternatively, one possible way to determine a positive direction of the first image may be during projection of the first electronic device, at least three points that are not on the same straight line may be determined on the first image, or one point in a certain corner on the first image may be determined, for example, one point in the upper left corner of the first image is determined. For example, during projection, the first electronic device may determine projected light intensity of the determined point as a first light intensity, and make the first light intensity be more than light intensity to which the other points on the first image correspond. In this way, the second electronic device may determine the positive direction of the first image according to these points.

In this case, the first electronic device needs to first determine the at least three points or the one point in a certain corner, and the position or region on the first image where the at least three points or the point in a certain corner is, for example, this position or region may be uniformly named as a first region, after the first region is determined, the first electronic device may determine light intensity to which the respective regions on the first image correspond when projecting the first image, for example, the first electronic device may determine the light intensity to which the first region corresponds as the first light intensity, and the light intensity to which the other regions except the first region on the first image correspond as a second light intensity, and make the first light intensity be larger than the second light intensity. When determining the first region, the first electronic device may determine the position of the first region on the first image, for example, the first region may be located in a top left corner, a top right corner, or other different positions of the first image. Since the communication connection is already established between the first electronic device and the second electronic device, the first electronic device may inform the second electronic device of the position of the first region on the first image through the communication connection.

After the first image is projected onto the touch sensing unit of the second electronic device, the second electronic device may analyze the acquired first image, and determine the light intensity to which the respective points on the first image correspond, then the second electronic device can analyze that the first light intensity to which the first region corresponds on the first image is larger than the second light intensity to which other regions correspond, and the second electronic device already learns that the position where the first region is on the first image through the communication connection, then the second electronic device may determine the positive direction of the first image accordingly.

Optionally, one possible way to determine the positive direction of the first image may be providing a plurality of sensors at an edge of the second electronic device, for example, an infrared sensor, a proximity sensor, or other different types of sensors. At which direction of the second electronic device there is a personal or an object can be detected through the sensors, for example, it is determined that there is a personal at a first edge of the second electronic device, thereby a vertical line from a center of the first image to the first edge is made, it may be determined that a direction that points to the first image along the vertical line is the positive direction. This situation applies to cases where the second electronic device has a large size touch sensing unit, for example, the second electronic device may be a smart table placed horizontally.

In this case, for example, the second electronic device may detect through sensors that a user is located at a first direction of the second electronic device, the first direction corresponds to a first edge of the second electronic device, the second electronic device may determine a vertical line from a center of the first image to the first edge, and determine that a direction that points to the first image along the vertical line is the positive direction.

In the embodiment of the present disclosure, after the positive direction is determined, a coordinate system may be determined in the first sub touch sensitive region based on the first direction, and thereby the first coordinate information subset to which the first operation corresponds in the first sub touch sensitive region may be determined according to the determined coordinate system. In this case, the determined coordinate system may be taken as a relative coordinate system.

Alternatively, in the embodiment of the present disclosure, after the positive direction is determined, a coordinate system may be determined in the touch sensitive region based on the first direction, and thereby the first coordinate information set to which the first operation corresponds in the touch sensitive region may be determined according to the determined coordinate system. In this case, the determined coordinate system may be taken as an absolute coordinate system.

That is, in the embodiment of the present disclosure, after the positive direction of the first image is determined, then the second electronic device can determine the first coordinate information set to which the first operation corresponds according to the positive direction, and the first electronic can correctly respond based on the first operation information.

Step 203: transmitting the first operation information to the first electronic device, so that the first electronic device can determine and project a second image based on the first operation information and the first image.

After determining the first operation information, the second electronic device may transmit to the first operation information to the first electronic device; after receiving the first operation information, the first electronic device may generate a first operation instruction based on the first operation information, determine the second image by executing the first operation instruction, and project the second image after determining the second image.

The display control method in the present disclosure will be described below through several specific embodiments; the following embodiments mainly describe several possible scenarios of the previously mentioned method. It should be noted that the embodiments of the present disclosure are only for explaining the present disclosure, and not intended to limit the present disclosure. Embodiments that comply with the concept of the present disclose all are within the scope of the present disclosure, a personal skilled in the art naturally knows how to make a variant according to the concept of the present disclosure.

Fourth Embodiment

In this embodiment, the second electronic device is a smart TV, and the first electronic device is a handheld electronic device, which for example is a mobile phone in this embodiment.

The projection scenario in this embodiment may be the mobile phone has a sound outputting unit and a sound acquiring unit, which are provided respectively at both ends of the mobile phone. A projection direction of the projecting unit is the same as a first direction, which is a direction from the sound outputting unit to the sound acquiring unit. Specifically, it may be that the projecting unit is provided near the sound acquiring unit, and projects to a direction away from the sound acquiring unit. That is, the scenario of projecting when making a call. The intended use of this embodiment is to enable the user to watch the projected content while making a call, and thereby operate the projected content through the second electronic device, so that the calling is not affected and projected content can be operated conveniently, which facilitates using of the user.

When the second electronic device is in the projection area and the touch sensing unit faces towards the first electronic device, if the first electronic device projects, the first image can be formed on the touch sensing unit.

Prior to forming the first image on the touch sensing unit, the user may first performs an input operation on the touch sensing unit, for example, the user may draw a circle on the touch sensing unit, the second electronic device may determine the region within the circle as a first sub touch sensitive region, in this way, the second electronic device can correctly respond to the user' operation on the touch sensing unit only when the first image is within the first sub touch sensitive region. However, if the user operates on a region outside the first sub touch sensitive region, the response made by the second electronic device probably is not with regard to the first image.

In this embodiment, the second electronic device may have a display unit, which may be overlapped with the touch sensing unit. In this embodiment, the second electronic device has a touch display unit.

After the first sub touch sensitive region is determined on the touch sensitive region, the second electronic device may display a visual identifier used to label the first sub touch sensitive region on the display unit accordingly based on the first sub touch sensitive region on the touch sensitive region.

Because when the user watches projected content of the projecting unit through the touch sensing unit, the projected content probably is not always within the first sub touch sensitive region, a part or the whole of the projected content probably is outside the first sub touch sensitive region during the projection. However, when the user needs to operate the projected content, the whole projected content probably needs to be moved within the first sub touch sensitive region, for the touch sensing unit can correctly respond to the user' operation only within the first sub touch sensitive region. A visual identifier used to label the first sub touch sensitive region is displayed on the display unit, which facilitate the user determining the position of the first sub touch sensitive region at any time, and the user adjusting the position of the projected content at any time, so that the user can perform a more accurate operation with regard to the projected content.

When the first image is formed on the first sub touch sensing unit, the user may want to operate the first image. The user may perform a first operation directly on the first touch sensing unit; the second electronic device can acquire the first operation by the touch sensing unit. In this embodiment, the first image is a main interface of the mobile phone, the first operation performed by the user is a double-click operation on an icon to which the Short Message application on the main interface corresponds.

After acquiring the first operation, the second electronic device may determine the first operation information corresponding to the first operation, the first operation information may at least include a first coordinate information set to which the first operation corresponds.

In this embodiment, the second electronic device determines in the touch sensitive region the first sub touch sensitive region as a projection region of the first image, then the second electronic device may determine the first operation information to which the first operation corresponds in the first sub touch sensitive region, the first coordinate set information included in the first operation information may be coordinate set information to which the first operation corresponds in the first sub touch sensing unit. In this case, the first coordinate set information may be taken as relative coordinate set information.

After determining the first operation information, the second electronic device may transmit the first operation information to the first electronic device; after receiving the first operation information, the first electronic device may generate a first operation instruction based on the first operation information, determine the second image by executing the first operation instruction, and project the second image after determining the second image. In this case, the second image may be the image to which the Short Message application corresponds.

Fifth Embodiment

In this embodiment, the second electronic device is a smart table, and the first electronic device is a handheld electronic device, for example, a mobile phone.

When the second electronic device is in the projection area and the touch sensing unit faces towards the first electronic device, if the first electronic device projects, the first image can be formed on the touch sensing unit.

Prior to forming the first image on the touch sensing unit, the user may first performs an input operation on the touch sensing unit, for example, the user may draw a circle on the touch sensing unit, the second electronic device may determine the region within the circle as the a first sub touch sensitive region, in this way, the second electronic device can correctly respond to the user' operation on the touch sensing unit only when the first image is within the first sub touch sensitive region. However, if the user operates on a region outside the first sub touch sensitive region, the response made by the second electronic device probably is not with regard to the first image.

In this embodiment, the second electronic device may have a display unit, which may be overlapped with the touch sensing unit. In this embodiment, the second electronic device has a touch display unit.

After the first sub touch sensitive region is determined on the touch sensitive region, the second electronic device may display a visual identifier used to label the first sub touch sensitive region on the display unit accordingly based on the first sub touch sensitive region on the touch sensitive region.

Because when the user watches projected content of the projecting unit through the touch sensing unit, the projected content probably is not always within the first sub touch sensitive region, a part or the whole of the projected content probably is outside the first sub touch sensitive region during the projection. However, when the user needs to operate the projected content, the whole projected content probably needs to be moved within the first sub touch sensitive region, for the touch sensing unit can correctly respond to the user' operation only within the first sub touch sensitive region. A visual identifier used to label the first sub touch sensitive region is displayed on the display unit, which facilitate the user determining the position of the first sub touch sensitive region at any time, and adjusting the position of the projected content at any time, so that the user can perform a more accurate operation with regard to the projected content.

When the first image is formed on the first sub touch sensing unit, the user may want to operate the first image. The user may perform a first operation directly on the first touch sensing unit; the second electronic device can acquire the first operation by the touch sensing unit. In this embodiment, the first image is a main interface of the mobile phone, the first operation performed by the user is a double-click operation on an icon to which the Short Message application on the main interface corresponds.

After acquiring the first operation, the second electronic device may first determine a positive direction of the first image.

In this embodiment, a plurality of sensors may be provided at an edge of the second electronic device, at which direction of the second electronic device there is a personal or an object can be detected through the sensors, for example, it is determined that there is a personal at a first edge of the second electronic device, thereby a vertical line from a center of the first image to the first edge is made, it may be determined that a direction that points to the first image along the vertical line is the positive direction.

After the positive direction is determined, the first operation information corresponding to the first operation may be determined according to the positive direction, the first operation information may at least include a first coordinate information set to which the first operation corresponds. After the positive direction is determined, a coordinate system may be determined in the first sub touch sensitive region according to the positive direction, the first coordinate information subset to which the first operation corresponds may be determined according to the determined coordinate system.

In this embodiment, the second electronic device determines in the touch sensitive region the first sub touch sensitive region as a projection region of the first image, then the second electronic device may determine the first operation information to which the first operation corresponds in the first sub touch sensitive region, the first coordinate set information included in the first operation information may be coordinate set information to which the first operation corresponds in the first sub touch sensing unit. In this case, the first coordinate set information may be taken as relative coordinate set information.

After determining the first operation information, the second electronic device may transmit the first operation information to the first electronic device; after receiving the first operation information, the first electronic device may generate a first operation instruction based on the first operation information, determine the second image by executing the first operation instruction, and project the second image after determining the second image. In this case, the second image may be the image to which the Short Message application corresponds.

Figure 3:
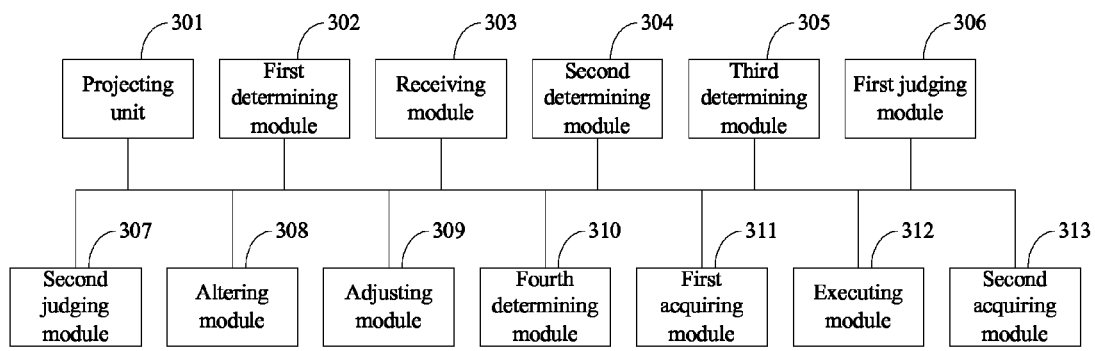
FIG. 3 is a detailed structure diagram of the first electronic device in the embodiments of the present disclosure.

Referring to FIG. 3, an embodiment of the present disclosure provides an electronic device having a projecting unit 301 with a projection area and capable of communicating with a second electronic device having a touch sensing unit. The first electronic device in the embodiment of the present disclosure may be the same electronic device as the first electronic device in the embodiment as shown in FIGS. 1 and 2A, the second electronic device in the embodiment of the present disclosure may be the same electronic device as the second electronic device in the embodiment as shown in FIGS. 1 and 2A. The first electronic device may include a first determining module 302, a receiving module 303, and a second determining module 304.

In some embodiments, the first electronic device may further include a third determining module 305, a first judging module 306, a second judging module 307, an altering module 308, an adjusting module 309, a fourth determining module 310, a first acquiring module 311, an executing module 312, and a second acquisition module 313.

The first determining module 302 may be for determining a first image to be projected.

The first determining module 302 may be further for determining the second image to be projected.

The projecting unit 301 may be for projecting the first image, the first image being capable of forming on the touch sensing unit when the second electronic device is in the projection area and the touch sensing unit faces towards the first electronic device, and projecting a second image.

The projecting unit 301 may be specifically for projecting the first image when the first ratio and the second ratio match, the first image being capable of forming on the touch sensing unit when the second electronic device is in the projection area and the touch sensing unit faces towards the first electronic device.

The projecting unit 301 may be specifically for projecting the first image when the first distance is within the predetermined distance range, the first image being capable of forming on the touch sensing unit when the second electronic device is in the projection area and the touch sensing unit faces towards the first electronic device.

The projecting unit 301 may be specifically for projecting the first image when the first distance is within the predetermined distance range, the first image being capable of forming on the touch sensing unit when the second electronic device is in the projection area and the touch sensing unit faces towards the first electronic device.

The projecting unit 301 may be specifically for projecting the first image whose area value is the second area value, the first image being capable of forming on the touch sensing unit when the second electronic device is in the projection area and the touch sensing unit faces towards the first electronic device.

The projecting unit 301 may be specifically for projecting the first image whose area value is the third area value, the first image being capable of forming on the touch sensing unit when the second electronic device is in the projection area and the touch sensing unit faces towards the first electronic device.

The projecting unit 301 may be further for projecting the second image and the third image projection.

The receiving module 303 may be for receiving first operation information transmitted by the second electronic device, the first operation information being information acquired by the second electronic device in response to a first operation performed by a user on the touch sensing unit.

The second determining module 304 may be for determining the second image based on the first image and the first operation information.

The second determining module 304 may be further for determining the third image based on the second image and the second operation information.

The third determining module 305 may be for determining a first ratio of the first image, and a second ratio of a touch sensitive region of the touch sensing unit.

The first judging module 306 may be for judging whether or not the first ratio and the second ratio match.

The second judging module 307 may be for judging whether or not a first distance between the first electronic device and the second electronic device is within a predetermined distance range.

The altering module 308 may be for, when the first distance is less than a minimum value of the predetermined distance range, altering area of the first image from a first area value into a second area value that matches area of the touch sensitive region and is larger than the first area value.

The altering module 308 may be for, when the first distance is more than a maximum value of the predetermined distance range, altering area of the first image from a first area value into a third area value that matches area of the touch sensitive region, the first area value being larger than the third area value.

The adjusting module 309 may be for, when the first ratio and the second ratio do not match, adjusting ratio of the first image from the first ratio into a third ratio that matches the second ratio according to the second ratio.

In the embodiment of the present disclosure, the first electronic device may at least have a first projection mode and a second projection mode, the fourth determining module 310 may be for determining that the first electronic device is in the first projection mode.

The first acquiring module 311 may be for acquiring a first trigger instruction for switching a projection mode.

The executing module 312 may be for executing the first trigger instruction to switch the projection mode of the first electronic device to the second projection mode from the first projection mode.

In the embodiment of the present disclosure, the first electronic device may have an image acquiring unit, the second acquiring module 313 may be for acquiring second operation information by the image acquiring unit, the second operation information being operation information determined based on gesture information acquired by the image acquiring unit.

Figure 4:
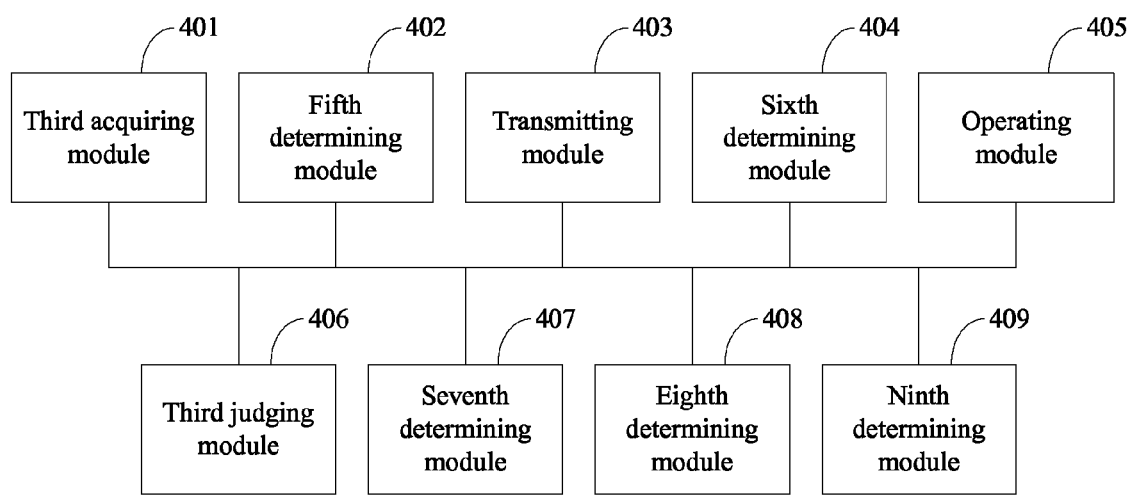
FIG. 4 is a detailed structure diagram of the second electronic device in the embodiments of the present disclosure.

Referring to FIG. 4, an embodiment of the present disclosure provides an electronic device having a touch sensing unit and capable of communicating with a first electronic device having a projecting unit with a projection area. The electronic device in this embodiment of the present disclosure may be the same electronic device as the second electronic device in the embodiments as shown in FIGS. 1, 2A, and 3, and the first electronic device in this embodiment of the present disclosure may be the same electronic device as the first electronic device in the embodiments as shown in FIGS. 1, 2A, and 3. The second electronic device may include a third acquiring module 401, a fifth determining module 402, and a transmitting module 403.

In some embodiments, the second electronic device may further include a sixth determining module 404, an operating module 405, a third determining module 406, a seventh determining module 407, an eighth determining module 408, and a ninth determining module 409.

The third acquiring module 401 may be for acquiring a first operation by the touch sensing unit when the second electronic device is in the projection area, the touch sensing unit faces towards the first electronic device, and a first image acquired by the projecting unit is formed on the touch sensing unit.

The fifth determining module 402 may be for determining first operation information to which the first operation corresponds, the first operation information at least including a first coordinate information set to which the first operation corresponds.

The fifth determining module 402 may be specifically determining the first operation information to which the first operation corresponds in the first sub touch sensitive region, the first operation information at least including the first coordinate information set to which the first operation corresponds in the first sub touch sensitive region.

The fifth determining module 402 may be specifically for determining the first operation information to which the first operation corresponds according to the positive direction.

The transmitting module 403 may be for transmitting the first operation information to the first electronic device, so that the first electronic device can determine and project a second image based on the first operation information and the first image.

The sixth determining module 404 may be for determining a first sub touch sensitive region on a touch sensitive region of the touch sensing unit, area of the first sub touch sensitive region being smaller than that of the touch sensitive region.

In the embodiment of the present disclosure, the electronic device may have a display unit, which is overlapped with the touch sensing unit; the sixth determining module 404 may include a first responding sub-module and a first operating sub-module.

The first responding sub-module may be for responding to a detected user input operation, and determining the first sub touch sensitive region on the touch sensitive region.

The first operating sub-module may be for displaying a visual identifier used to label the first sub touch sensitive region on the display unit accordingly based on the first sub touch sensitive region on the touch sensitive region.

In the embodiment of the present disclosure, the electronic device may have an optical acquiring unit set, which may be overlapped with the touch sensing unit, each optical acquiring unit in the optical acquiring unit set is capable of acquiring light intensity information. The sixth determining sub-module 404 may include a first determining sub-module, a second determining sub-module, and a third determining sub-module.

The first determining sub-module may be for determining, in the optical acquiring unit set, a first optical acquiring unit subset whose acquired light intensity information is first light intensity information and a second optical acquiring unit subset whose acquired light intensity information is second light intensity information, the first light intensity information being different from the second light intensity information.

The second determining sub-module may be for determining a first subset region to which the first optical acquiring unit subset corresponds in the optical acquiring unit set.

The third determining sub-module may be for determining the first sub touch sensitive region in the touch sensitive region accordingly based on the first subset region.

In the embodiment of the present disclosure, the first optical acquiring unit subset includes M optical acquiring units, the second optical acquiring unit subset includes N optical acquiring units, M is a positive integer, N is an integer not less than zero, the operating module 405 may be for acquiring third light intensity information by P optical acquiring units in the optical acquiring unit set, and acquiring fourth light intensity information by remaining M+N-P optical acquiring units in the optical acquiring unit sets, P being a positive integer In the embodiment of the present disclosure, the first optical acquiring unit subset includes M optical acquiring units, the second optical acquiring unit subset includes N optical acquiring units, M is a positive integer, N is an integer not less than zero, the third judging module 406 may be for judging whether or not a third optical acquiring unit subset formed by the P optical acquiring units is the same as the first optical acquiring unit subset.

In the embodiment of the present disclosure, the first optical acquiring unit subset includes M optical acquiring units, the second optical acquiring unit subset includes N optical acquiring units, M is a positive integer, N is an integer not less than zero, the seventh determining module 407 may be for determining a second subset region to which the third optical acquiring subset corresponds in the optical acquiring unit set when the third optical acquiring unit subset is different from the first optical acquiring unit subset.

In the embodiment of the present disclosure, the first optical acquiring unit subset includes M optical acquiring units, the second optical acquiring unit subset includes N optical acquiring units, M is a positive integer, N is an integer not less than zero, the eighth determining module 408 may be for re-determining the first sub touch sensitive region in the touch sensitive region according to the second subset region.

The ninth determining module 409 may be for detecting and determining a positive direction of the first image.

The display method in the embodiments of the present disclosure can be applied to a first electronic device having a projecting unit with a projection area and capable of communicating with a second electronic device having a touch sensing unit, wherein the method may include steps of determining a first image to be projected; projecting the first image, the first image being capable of forming on the touch sensing unit when the second electronic device is in the projection area and the touch sensing unit faces towards the first electronic device; receiving first operation information transmitted by the second electronic device, the first operation information being information acquired by the second electronic device in response to a first operation performed by a user on the touch sensing unit; determining a second image based on the first image and the first operation information; and projecting the second image.

In the embodiments of the present disclosure, when the first electronic device needs to project, it can project the first image to be projected onto the touch sensing unit of the second electronic device, so that when the user needs to operate the first image, he/she can directly operate on the touch sensing unit, the second electronic device can transmit the acquired first operation information to the first electronic device, and the first electronic device can respond based on the first operation information. In such way, because the user can directly operate on the touch sensing unit, the user can more accurately operate an object to be operated on the touch sensing unit, and the touch sensing unit can also determine more accurate operation information according to the user' operation, thereby the first electronic device can more accurately respond according to the operation information, which obviously reduces the rate of error response of the first electronic device, and the user can also obtain a desired result more quickly, and it is not necessary to operate multiple times, and for the user, it saves time, improves operation efficiency, and improves user experience. Meanwhile, because it is not necessary to operate multiple times, the electronic device will not have to respond multiple times, aim can be achieved only by responding one time, which reduces the burden on the electronic device.

Those skilled in the art should understand that, the embodiments of the present disclosure can be provided as a method, a system, or a computer program product. Therefore, the present disclosure can adopt forms of a full hardware embodiment, a full software embodiment, or an embodiment combining software and hardware aspects. In addition, the present disclosure can adopt forms of a computer program product implemented on one or more computer usable storage mediums (including, but not limited to, magnetic disk storage, CD-ROM, optical memory, or the like) including computer usable program codes.

The present disclosure is described by referring to flow charts and/or block diagrams of method, apparatus (system), and computer program product according to the embodiments of the present disclosure. It should be understood that each flow and/or block in the flow charts and/or block diagrams and the combination of the flow and/or block in the flow charts and/or block diagrams can be implemented by computer program instructions. These computer program instructions can be provided to processors of a general purpose computer, a dedicated computer, an embedded processor or other programmable data processing apparatus to generate a machine, so that a device for implementing functions specified in one or more flows of the flow charts and/or one or more blocks of the block diagrams is generated by the instructions executed by the processors of the computer or other programmable data processing apparatus.

These computer program instructions can also be stored in computer readable storage which is able to direct the computer or other programmable data processing apparatus to operate in specific manners, so that the instructions stored in the computer readable storage generate manufactured articles including commander equipment, which implements functions specified by one or more flows in the flow charts and/or one or more blocks in the block diagrams.

These computer program instructions can be loaded to computer or other programmable data processing apparatus, so that a series of operation steps are executed on the computer or other programmable apparatus to generate computer implemented process, so that the instructions executed on the computer or other programmable apparatus provide steps for implementing functions specified in one or more flows of the flow charts and/or one or more blocks of the block diagrams.

Obviously, it is possible for a person skilled in the art to make various modifications and variations to the present disclosure without departing from the spirit and scope of the present disclosure. Thus, if these modifications and variations are within the scope of the claims and technical equivalents of the present disclosure, the present disclosure is also intended to include these modifications and variations.

What is claimed is:

1. A display method applied to a first electronic device having a projecting unit with a projection area and capable of communicating with a second electronic device having a touch sensing unit, the method comprising:
    determining a first image to be projected;
    projecting the first image, the first image being capable of forming on the touch sensing unit when the second electronic device is in the projection area and the touch sensing unit faces towards the first electronic device;
    receiving first operation information transmitted by the second electronic device, the first operation information being information acquired by the second electronic device in response to a first operation performed by a user on the touch sensing unit;
    determining a second image based on the first image and the first operation information; and
    projecting the second image,
    wherein prior to projecting the first image, further comprising:
    determining a first ratio of the first image, and a second ratio of a touch sensitive region of the touch sensing unit;
    judging whether or not the first ratio and the second ratio match; and
    the step of projecting the first image, the first image being capable of forming on the touch sensing unit when the second electronic device is in the projection area and the touch sensing unit faces towards the first electronic device includes: projecting the first image when the first ratio and the second ratio match, the first image being capable of forming on the touch sensing unit when the second electronic device is in the projection area and the touch sensing unit faces towards the first electronic device.

2. The method of claim 1, wherein after judging whether or not the first ratio and the second ratio match, further comprising: judging whether or not a first distance between the first electronic device and the second electronic device is within a predetermined distance range;
    projecting the first image, the first image being capable of forming on the touch sensing unit when the second electronic device is in the projection area and the touch sensing unit faces towards the first electronic device includes: projecting the first image when the first distance is within the predetermined distance range, the first image being capable of forming on the touch sensing unit when the second electronic device is in the projection area and the touch sensing unit faces towards the first electronic device.

3. The method of claim 2, wherein after judging whether or not a first distance between the first electronic device and the second electronic device is within a predetermined distance range, further comprising: when the first distance is less than a minimum value of the predetermined distance range, altering area of the first image from a first area value into a second area value that matches area of the touch sensitive region and is larger than the first area value;

the step of projecting the first image, the first image being capable of forming on the touch sensing unit when the second electronic device is in the projection area and the touch sensing unit faces towards the first electronic device includes: projecting the first image whose area value is the second area value, the first image being capable of forming on the touch sensing unit when the second electronic device is in the projection area and the touch sensing unit faces towards the first electronic device.

4. The method of claim 2, wherein after judging whether or not a first distance between the first electronic device and the second electronic device is within a predetermined distance range, further comprising: when the first distance is more than a maximum value of the predetermined distance range, altering area of the first image from a first area value into a third area value that matches area of the touch sensitive region, the first area value being larger than the third area value;

the step of projecting the first image, the first image being capable of forming on the touch sensing unit when the second electronic device is in the projection area and the touch sensing unit faces towards the first electronic device includes: projecting the first image whose area value is the third area value, the first image being capable of forming on the touch sensing unit when the second electronic device is in the projection area and the touch sensing unit faces towards the first electronic device.

5. The method of claim 1, wherein after judging whether or not the first ratio and the second ratio match, further comprising: adjusting ratio of the first image from the first ratio into a third ratio that matches the second ratio according to the second ratio when the first ratio and the second ratio do not match.

6. The method of claim 1, wherein the first electronic device at least has a first projection mode and a second projection mode, and prior to determining a first image to be projected, further comprising: determining that the first electronic device is in the first projection mode.

7. The method of claim 6, wherein after determining a second image based on the first image and the first operation information and projecting the second image, further comprising:
acquiring a first trigger instruction for switching a projection mode; and
executing the first trigger instruction to switch the projection mode of the first electronic device to the second projection mode from the first projection mode.

8. The method of claim 7, wherein the first electronic device has an image acquiring unit, after switching the projection mode of the first electronic device to the second projection mode from the first projection mode, the method further includes steps of:
determining the second image to be projected;
projecting the second image;
acquiring second operation information by the image acquiring unit, the second operation information being operation information determined based on gesture information acquired by the image acquiring unit;
determining a third image based on the second image and the second operation information; and
projecting the third image.

9. A display control method applied to a second electronic device having a touch sensing unit and capable of communicating with a first electronic device having a projecting unit with a projection area, the method comprising:
acquiring a first operation by the touch sensing unit when the second electronic device is in the projection area, the touch sensing unit faces towards the first electronic device, and a first image acquired by the projecting unit is formed on the touch sensing unit;
determining first operation information to which the first operation corresponds, the first operation information at least including a first coordinate information set to which the first operation corresponds; and
transmitting the first operation information to the first electronic device, so that the first electronic device can determine and project a second image based on the first operation information and the first image,
wherein prior to that a first image acquired by the projecting unit is formed on the touch sensing unit, further comprising: determining a first sub touch sensitive region on a touch sensitive region of the touch sensing unit, area of the first sub touch sensitive region being smaller than that of the touch sensitive region.

10. The method of claim 9, wherein the electronic device has a display unit which is overlapped with the touch sensing unit, and determining a first sub touch sensitive region on a touch sensitive region of the touch sensing unit comprises:
in responsive to a detected user input operation, determining the first sub touch sensitive region on the touch sensitive region; and
displaying a visual identifier used to label the first sub touch sensitive region on the display unit correspondingly according to the first sub touch sensitive region on the touch sensitive region.

11. The method of claim 9, wherein the electronic device has an optical acquiring unit set, which is overlapped with the touch sensing unit, each optical acquiring unit in the optical acquiring unit set is capable of acquiring light intensity information; the step of determining a first sub touch sensitive region on a touch sensitive region of the touch sensing unit comprising:
determining, in the optical acquiring unit set, a first optical acquiring unit subset whose acquired light intensity information is first light intensity information and a second optical acquiring unit subset whose acquired light intensity information is second light intensity information, the first light intensity information being different from the second light intensity information;
determining a first subset region to which the first optical acquiring unit subset corresponds in the optical acquiring unit set; and
determining the first sub touch sensitive region in the touch sensitive region correspondingly according to the first subset region.

12. The method of claim 11, wherein the first optical acquiring unit subset includes M optical acquiring units, the second optical acquiring unit subset includes N optical acquiring units, M is a positive integer, N is an integer not less than zero, after determining a first sub touch sensitive region on a touch sensitive region of the touch sensing unit, further comprising:

acquiring third light intensity information by P optical acquiring units in the optical acquiring unit set, and acquiring fourth light intensity information by remaining M+N-P optical acquiring units in the optical acquiring unit sets, P being a positive integer;

determining whether or not a third optical acquiring unit subset formed by the P optical acquiring units is the same as the first optical acquiring unit subset;

determining a second subset region to which the third optical acquiring subset corresponds in the optical acquiring unit set when the third optical acquiring unit subset is different from the first optical acquiring unit subset; and re-determining the first sub touch sensitive region in the touch sensitive region according to the second subset region.

13. The method of claim 9, wherein the step of determining first operation information to which the first operation corresponds, the first operation information at least including a first coordinate information set to which the first operation corresponds includes a step of: determining the first operation information to which the first operation corresponds in the first sub touch sensitive region, the first operation information at least including the first coordinate information set to which the first operation corresponds in the first sub touch sensitive region.

14. The method of claim 9, wherein the step of determining first operation information to which the first operation corresponds includes: detecting and determining a positive direction of the first image, and determining the first operation information to which the first operation corresponds according to the positive direction.

15. An electronic device having a projecting unit with a projection area and capable of communicating with a second electronic device having a touch sensing unit, the electronic device comprising:

a first determining module for determining a first image to be projected;

the projecting unit for projecting the first image, the first image being capable of forming on the touch sensing unit when the second electronic device is in the projection area and the touch sensing unit faces towards the first electronic device, and projecting a second image;

a receiving module for receiving first operation information transmitted by the second electronic device, the first operation information being information acquired by the second electronic device in response to a first operation performed by a user on the touch sensing unit; and a second determining module for determining the second image based on the first image and the first operation information, wherein the electronic device further includes a third determining module and a first judging module;

the third determining module for determining a first ratio of the first image, and a second ratio of a touch sensitive region of the touch sensing unit;

the first judging module for judging whether or not the first ratio and the second ratio match;

the projecting unit is specifically for: projecting the first image when the first ratio and the second ratio match, the first image being capable of forming on the touch sensing unit when the second electronic device is in the projection area and the touch sensing unit faces towards the first electronic device.

16. An electronic device having a touch sensing unit and capable of communicating with a first electronic device having a projecting unit with a projection area, the electronic device comprising:

a third acquiring module for acquiring a first operation by the touch sensing unit when the second electronic device is in the projection area, the touch sensing unit faces towards the first electronic device, and a first image acquired by the projecting unit is formed on the touch sensing unit;

a fifth determining module for determining first operation information to which the first operation corresponds, the first operation information at least including a first coordinate information set to which the first operation corresponds;

a transmitting module for transmitting the first operation information to the first electronic device, so that the first electronic device can determine and project a second image based on the first operation information and the first image; and a sixth determining module for determining a first sub touch sensitive region on a touch sensitive region of the touch sensing unit, area of the first sub touch sensitive region being smaller than that of the touch sensitive region.

\* \* \* \* \*